United States Patent
Stone et al.

(10) Patent No.: US 10,139,951 B2
(45) Date of Patent: Nov. 27, 2018

(54) INFORMATION HANDLING SYSTEM VARIABLE CAPACITANCE TOTEM INPUT MANAGEMENT

(71) Applicant: Dell Products L.P., Round Rock, TX (US)

(72) Inventors: Larry A. Stone, Austin, TX (US); Jace W. Files, Round Rock, TX (US); Yagiz C. Yildiz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 15/347,304

(22) Filed: Nov. 9, 2016

(65) Prior Publication Data

US 2018/0129335 A1    May 10, 2018

(51) Int. Cl.
| | |
|---|---|
| *G06F 3/044* | (2006.01) |
| *G06F 3/041* | (2006.01) |
| *G06F 3/0488* | (2013.01) |

(52) U.S. Cl.
CPC ............ *G06F 3/0416* (2013.01); *G06F 3/044* (2013.01); *G06F 3/0488* (2013.01); *G06F 2203/04104* (2013.01)

(58) Field of Classification Search
CPC ........ G06F 3/041–3/047; G06F 3/033–3/0395
USPC .... 178/18.01–19.07; 345/156–166, 173–178
See application file for complete search history.

(56) References Cited

U.S. PATENT DOCUMENTS

| | | |
|---|---|---|
| 6,134,661 A | 10/2000 | Topp |
| 6,297,804 B1 | 10/2001 | Kashitani |
| 6,504,530 B1 | 1/2003 | Wilson et al. |
| 6,614,422 B1 | 9/2003 | Rafii et al. |
| 7,252,394 B1 | 8/2007 | Fu |
| 7,692,667 B2 | 4/2010 | Nguyen et al. |
| 8,228,315 B1 | 7/2012 | Starner et al. |
| 8,321,810 B2 | 11/2012 | Henitze |
| 8,531,352 B2 | 9/2013 | Zeng et al. |
| 8,958,158 B1 | 2/2015 | Raffle et al. |
| 9,348,420 B2 | 5/2016 | Krishnakumar et al. |
| 9,690,400 B2 | 6/2017 | Krishnakumar et al. |
| 9,958,959 B2 * | 5/2018 | Dietz ................... G06F 3/0304 |
| 2002/0075240 A1 | 6/2002 | Lieberman et al. |

(Continued)

FOREIGN PATENT DOCUMENTS

WO    WO2016155887    10/2016

OTHER PUBLICATIONS

Machine translation for WO 2016-155887, Oct. 6, 2016, 34 pages.

(Continued)

*Primary Examiner* — Michael Pervan
(74) *Attorney, Agent, or Firm* — Zagorin Cave LLP; Robert W. Holland

(57) ABSTRACT

An information handling system touchscreen display interacts with totem devices by recognizing and tracking spectral signatures of the totem devices so that totem positions are reported as a single length, width and rotational orientation message to a host operating system. Ignore zones and hysteresis time periods are defined from the position message based upon totem context so that the host operating system processes touchscreen inputs with minimal latency and improved accuracy. Communication and battery charging are provided to the totem by the touchscreen display will illumination directed to the totem position.

20 Claims, 13 Drawing Sheets

(56) References Cited

U.S. PATENT DOCUMENTS

| | | |
|---|---|---|
| 2003/0126317 A1 | 7/2003 | Chang |
| 2003/0132921 A1 | 7/2003 | Torunoglu et al. |
| 2004/0049462 A1 | 3/2004 | Wang |
| 2004/0100479 A1 | 5/2004 | Nakano et al. |
| 2004/0267995 A1 | 12/2004 | Peng |
| 2005/0024606 A1 | 2/2005 | Li et al. |
| 2005/0141752 A1 | 6/2005 | Bjorgan et al. |
| 2005/0225538 A1 | 10/2005 | Verhaegh |
| 2005/0254453 A1 | 11/2005 | Barneah |
| 2005/0264987 A1 | 12/2005 | Krancher et al. |
| 2005/0281475 A1 | 12/2005 | Wilson |
| 2006/0092170 A1 | 5/2006 | Bathiche et al. |
| 2006/0139714 A1 | 6/2006 | Gruhike et al. |
| 2006/0244719 A1 | 11/2006 | Brigham |
| 2006/0256090 A1 | 11/2006 | Huppi |
| 2007/0035521 A1 | 2/2007 | Jui et al. |
| 2007/0058879 A1 | 3/2007 | Cutler et al. |
| 2007/0270213 A1 | 11/2007 | Nguyen et al. |
| 2008/0231611 A1 | 9/2008 | Bathiche et al. |
| 2008/0238879 A1* | 10/2008 | Jaeger ............... G06F 3/03545 345/173 |
| 2009/0077504 A1 | 3/2009 | Bell et al. |
| 2009/0168027 A1 | 7/2009 | Dunn et al. |
| 2009/0184962 A1 | 7/2009 | Kuriakose et al. |
| 2009/0249339 A1 | 10/2009 | Larsson et al. |
| 2009/0278871 A1 | 11/2009 | Lewis |
| 2009/0295712 A1 | 12/2009 | Ritzau |
| 2010/0053110 A1 | 3/2010 | Carpenter et al. |
| 2010/0079369 A1 | 4/2010 | Hartmann et al. |
| 2010/0250801 A1 | 9/2010 | Sangster et al. |
| 2010/0328200 A1 | 12/2010 | Yu |
| 2011/0012727 A1 | 1/2011 | Pance et al. |
| 2011/0157056 A1 | 6/2011 | Karpfinger |
| 2011/0181523 A1 | 7/2011 | Grothe et al. |
| 2011/0304580 A1 | 12/2011 | Wu et al. |
| 2012/0035934 A1 | 2/2012 | Cunningham |
| 2012/0050314 A1 | 3/2012 | Wang |
| 2012/0089348 A1 | 4/2012 | Perlin |
| 2012/0166993 A1 | 6/2012 | Anderson et al. |
| 2012/0169598 A1 | 7/2012 | Grossman et al. |
| 2012/0176311 A1 | 7/2012 | Bittenson |
| 2012/0194457 A1 | 8/2012 | Cannon et al. |
| 2012/0235909 A1 | 9/2012 | Birkenbach |
| 2012/0272179 A1 | 10/2012 | Stafford |
| 2012/0306767 A1 | 12/2012 | Campbell |
| 2012/0313858 A1 | 12/2012 | Park et al. |
| 2013/0082928 A1 | 4/2013 | Kim et al. |
| 2013/0111391 A1 | 5/2013 | Penner et al. |
| 2013/0132885 A1 | 5/2013 | Maynard et al. |
| 2013/0285901 A1 | 10/2013 | Lee et al. |
| 2014/0043289 A1 | 2/2014 | Stern |
| 2014/0051484 A1 | 2/2014 | Hunt et al. |
| 2014/0168083 A1 | 6/2014 | Ellard |
| 2014/0168132 A1 | 6/2014 | Graig |
| 2014/0191927 A1 | 7/2014 | Choi |
| 2014/0195933 A1 | 7/2014 | Rao |
| 2014/0204127 A1 | 7/2014 | Tann et al. |
| 2014/0210748 A1 | 7/2014 | Narita |
| 2014/0267866 A1 | 9/2014 | Short et al. |
| 2014/0327628 A1 | 11/2014 | Tijssen et al. |
| 2015/0039317 A1 | 2/2015 | Klein et al. |
| 2015/0097803 A1 | 4/2015 | Leigh et al. |
| 2015/0098182 A1 | 4/2015 | Liu et al. |
| 2015/0131913 A1 | 5/2015 | Anderson et al. |
| 2015/0169080 A1* | 6/2015 | Choi ..................... G06F 3/0488 345/174 |
| 2015/0248235 A1 | 9/2015 | Offenberg |
| 2015/0250021 A1 | 9/2015 | Stice et al. |
| 2015/0268773 A1 | 9/2015 | Sanaullah et al. |
| 2015/0379964 A1 | 12/2015 | Lee et al. |
| 2016/0054905 A1 | 2/2016 | Chai et al. |
| 2016/0063762 A1 | 3/2016 | Heuvel et al. |
| 2016/0085358 A1 | 3/2016 | Palanisamy |
| 2016/0126779 A1 | 5/2016 | Park |
| 2016/0179245 A1 | 6/2016 | Johansson et al. |
| 2016/0294973 A1 | 10/2016 | Bakshi et al. |
| 2016/0349926 A1 | 12/2016 | Okumura |
| 2016/0378258 A1 | 12/2016 | Lyons et al. |
| 2017/0269722 A1 | 9/2017 | Krishnakumar et al. |
| 2018/0074639 A1* | 3/2018 | Powell .................. G06F 3/0416 |
| 2018/0129336 A1 | 5/2018 | Files |
| 2018/0129337 A1 | 5/2018 | Stone |
| 2018/0129347 A1 | 5/2018 | Files |
| 2018/0129348 A1 | 5/2018 | Files |

OTHER PUBLICATIONS

U.S. Appl. No. 15/347,251, filed Nov. 9, 2016, entitled "Information Handling System Capacitive Touch Totem Management," to inventors Jace W. Files et al.

U.S. Appl. No. 15/347,278, filed Nov. 9, 2016, entitled "Information Handling System Totem Tracking Management," to inventors Jace W. Files et al.

U.S. Appl. No. 15/347,337, filed Nov. 9, 2016, entitled "Information Handling System Capacitive Touch Totem with Optical Communication Support," to inventors Jace W. Files and Yung-Chun Liu.

U.S. Appl. No. 15/347,361, filed Nov. 9, 2016, entitled "Information Handling System Capacitive Touch Totem with Optical Communication Support," to inventors Larry A. Stone et al.

Celluon, Magic Cube, printed Aug. 24, 2015 http://www.celluon.com/products_epic_overview.php.

Harrison, C., OmniTouch: "Wearable Multitouch Interaction Everywhere," Oct. 2011, http://chrisharrison.net/projects/omnitouch/omnitouch.pdf.

Ibar, Intelligent Surface System, printed Aug. 24, 2015 http://www.i-bar.ch/.

Indiegogo, E-inkey Dynamic Keyboard, printed Sep. 9, 2015 http://www.indiegogo.com/projects/e-inkey-dynamic-keyboard.

Leap Motion, Mac & PC Motion Controller for Games, Design, Virtual Reality & More, printed Aug. 24, 2015 https://www.leapmotion.com/.

Mistry et al., WUW—Wear UR World: A Wearable Gestural Interface, Apr. 4-9, 2009, Proceeding CHI '09 Extended Abstracts on Human Factors in Computing Systems, pp. 4111-4116.

razerzone.com, Razer Blade Pro, printed Aug. 24, 2015, http://www.razerzone.com/gaming-systems/razer-blade-pro.

Schmalstieg et al., Bridging Multiple User Interface Dimensions with Augmented Reality, Oct. 6, 2000, 2000 (ISAR 2000), Proceedings. IEEE and ACM International Symposium on Augmented Reality, pp. 20-29.

Sine Walker, MS-Windows focus-follows-mouse Registry hacks, Mar. 10, 2010, wordpress.com, https://sinewalker.wordpress.com/2010/03/10/ms-windows-focus-follows-mouse-registry-hacks/, pp. 1-2.

Smith, M., Alienware M17X R4 Review, Jun. 21, 2012, http://www.digitaltrends.com/laptop-reviews/alienware-m17x-r4-review/.

Sternon, J., Intel Nikiski Laptop Prototype with See-Through Touchpad Hands-On Pictures and Video, Jan. 9, 2012, http://www.theverge.com/2012/1/9/2694171/Intel-Nikiski-hands-on-pictures-video.

Sun Innovations, Expanded Heads-Up Display (E-HUD), printed Aug. 24, 2015 http://www.sun-innovations.com/index.php/products/fw-hud.

UBI, Sensor, printed Aug. 24, 2015, http://www.ubi-interactive.com/product/#UbiSensor.

\* cited by examiner

INFORMATION HANDLING SYSTEM VARIABLE CAPACITANCE TOTEM INPUT MANAGEMENT

CROSS REFERENCE TO RELATED APPLICATIONS

U.S. patent application Ser. No. 15/347,251, entitled "Information Handling System Capacitive Touch Totem Management" by inventors Jace W. Files, Larry A. Stone, Mark S. Sears, Yagiz C. Yildiz, and Sujata Das, filed on same day herewith, describes exemplary methods and systems and is incorporated by reference in its entirety.

U.S. patent application Ser. No. 15/347,278, entitled "Information Handling System Totem Tracking Management" by inventors Jace W. Files, Larry A. Stone, Mark S. Sears, and Yagiz C. Yildiz, filed on same day herewith, describes exemplary methods and systems and is incorporated by reference in its entirety.

U.S. patent application Ser. No. 15/347,337, entitled "Information Handling System Capacitive Touch Totem with Optical Communication Support" by inventors Jace W. Files and Yung-Chun Liu, filed on same day herewith, describes exemplary methods and systems and is incorporated by reference in its entirety.

U.S. patent application Ser. No. 15/347,361, entitled "Information Handling System Capacitive Touch Totem with Optical Communication Support" by inventors Larry A. Stone, Jace W. Files, Yagiz C. Yildiz, and Mark S. Sears, filed on same day herewith, describes exemplary methods and systems and is incorporated by reference in its entirety.

BACKGROUND OF THE INVENTION

Field of the Invention

The present invention relates in general to the field of information handling system user interface management, and more particularly, to an information handling system capacitive touch totem management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems interact with end users through a variety of input and output devices. Typical input devices include key boards, mice, touchpads, etc. that accept input actions and convert the input actions into signals interpreted by a processor. Typically output is presented at a display device, such as a flat panel LCD or OLED display panel. Flat panel displays provide high quality display resolution in a thin form factor. Some examples of flat panel displays include liquid crystal displays (LCD) that alter a presented back light to generate images, and organic light-emitting displays (OLED) that generate images with pixels that create desired light values. One advantage of flat panel displays is that portable information handling systems can integrate the displays into a portable housing while supporting a thin form factor and reduced power consumption. Another advantage is that flat panel displays readily adapt to include touchscreen inputs. End users often prefer to interact with user interfaces by performing touch inputs at a display touchscreen so that keyboard and mouse devices are not needed.

As touchscreen displays have improved and been adopted by end users in portable information handling systems, touch interfaces have become more common and intuitive. Further, touchscreen protective surfaces have become tougher and more resistant to breakage and scratching. As a result, desktop touchscreen displays that are horizontally disposed have become accepted as a flexible user interface. A horizontally-disposed touchscreen display rests on a desktop surface and presents user interfaces that end users touch to perform inputs. For example, a displayed keyboard allows an end user to make keyed inputs instead of relying on a fixed keyboard. With appropriately designed user interfaces, a horizontally-disposed touchscreen provides an interface that works more efficiently than mouse-based interfaces since an end user simply touches the input on the display resting on a desktop in front of the user.

One difficulty with the use of a horizontally-disposed display is that the touchscreen will often receive inadvertent touches that are not intended as inputs to the information handling system. For example, a palm or object resting on a touchscreen may be placed for user convenience or comfort rather than to generate an input by a touch. Typically touchscreen displays filter touches to identify finger touches as intended touches and to avoid inadvertent touches as inputs. In a desktop environment where a touchscreen display is horizontally-disposed, such filtering may consume processing resources so that latency is introduced between when an end user makes an intended touch and the intended touch is recorded on the display as an input. On the other hand, even where adequate processing resources are available to filter touch inputs in a timely manner, rapid processing of touches can result in presentation of inputs where no input was in fact intended. Although post-processing can remove such unintended presentations, even temporary presentation of incorrect data can lead to end user confusion and a poor user experience.

With horizontal disposition of touchscreen displays, totems have become an option to aid end user interactions with user interfaces. A totem is a device, often without any integrated intelligence, that interacts by touches to the display surface. For example, a mouse totem might move a cursor on a display based upon the position of the mouse totem on a horizontally disposed touchscreen display. Totem devices offer physical manipulation that translates into touch inputs to improve interface intuitiveness and usability. However, a totem tends to touch across a wider area than a finger touch, which tends to introduce difficulty for an operating system to recognize the totem versus inadvertent bulk touches, such as may be introduced by a palm. Further, as an end user manipulates a totem the totem bottom surface tends to lift from the touchscreen in an uneven manner that may lead to improper totem recognition and tracking. As totem contact regions lift off and re-contact a touchscreen display, irregular and unpredictable touch inputs increase demands on processing resources, often resulting in latency for totem input and incorrect tracking of the inputs at the touchscreen.

In some instances, totem devices include some level of intelligence that aids in the management of inputs. For example, a totem may include a Bluetooth transmitter, a microprocessor, an accelerometer and external lighting that aids end user interaction. One difficulty that arises with intelligent totems is tracking multiple totem devices so that a device associated with an intelligent input or interaction is at a location on the touchscreen display that is associated with the input. A registration process that associates a particular totem with a touch location introduces complexity that an end user must deal with as inputs are made, totems are added or removed and user interfaces change. In addition, registration of totems tends to increase latency and slow interactions by having wireless coordination completed before an end user can interact with a totem. Further, intelligent totems typically require some internal power source, such as a battery, so that keeping the battery charged or fresh presents the end user with an additional complexity that detracts from the simple nature of totems as "dumb" input devices.

SUMMARY OF THE INVENTION

Therefore, a need has arisen for a system and method which provides an information handling system totem user interaction with efficient and accurate totem tracking having minimal latency.

A further need exists for a system and method which provide reduced false touch detection by enhancing totem touch detection when a totem is in active use.

A further need exists for a system and method which provide time based monitoring of totem interactions with a variably set hysteresis based on user interface context to quickly and accurately measure totem inputs.

A further need exists for a system and method which provide communication between a totem and touchscreen display using illumination presented at the display and sensed by the totem.

A further need exists for a system and method which provide local control at a touchscreen display with a totem in the absence of a host operating system interface.

In accordance with the present invention, a system and method are provided which substantially reduce the disadvantages and problems associated with previous methods and systems for interacting a totem and an information handling system through a horizontally disposed touchscreen display. Totem recognition and tracking, such as by a dedicated digital signal processor using spectral analysis, resolves totem position to a length, width and rotational orientation on the touchscreen display to reduce host operating system processing and latency related to complex touch context. Ignore zones and hysteresis adapt for a totem based upon user interface context to focus touch processing on appropriate areas without introducing extraneous processing tasks or false input detection. Direct communication between a display and totem with light illumination at the totem lower surface enables command communication for a totem without a wireless interface or host operating system support. Two way communication is supported by selectively interfacing capacitance with contact points of the totem, such as when weight is placed on the totem indicating an end user input.

More specifically, an information handling system processes information with processing components, such as a CPU, memory, embedded controllers and firmware instructions. The information handling system accepts inputs made as touches to a touchscreen display, such as in a horizontal configuration resting on a desktop. Totem devices rest on the touchscreen display to accept end user manipulation and translate the end user manipulation into physical inputs detected as touches at the touchscreen display. A totem analyzer, such as a digital signal processor, performs totem recognition by searching for totem signatures on the touchscreen display, such as with spectral analysis of detected touch capacitance in a frequency, amplitude or phase domain. The totem analyzer reports totem positions to a host operating system as a single touch location message, such as a length, width and rotational orientation message. In response, a touch controller or operating system enforces ignore zones proximate to the totem and hysteresis for processing inputs related to touches proximate the totem so that processing resources are not diverted to manage detected inputs where the inputs likely relate to inadvertent touches related to totem interactions. Ignore zones and hysteresis adapt based upon detected context at the touchscreen display, such as the relative location of the totem at the display, the user interface associated with the totem, the end user hand location and the number of totems in use at the touchscreen display. Focusing touch detection to respond more quickly to expected touches of an intended nature while ignoring likely unintended touches provides a more efficient totem identification, registration and tracking.

In one embodiment, communication is supported between a logic device of the totem, such as a microcontroller, and a display logic device or host operating system. For example, a light detector disposed on the bottom surface of the totem detects illumination of the touchscreen display to receive commands. As another example, manipulation of a capacitive source interfacing with a totem contact point provides inputs to the touchscreen display in the form of varying capacitive input. By managing some or all totem interactions with a scalar of the touchscreen display, commands for local functions are enabled, such as charging of the totem battery with illumination provided from the display to the totem bottom surface or associating particular totems with touches made at the touchscreen display.

The present invention provides a number of important technical advantages. One example of an important technical advantage is that totem interactions between an information handling system and touchscreen display have improved latency and accuracy through spectral analysis of the totem signature that resolves totem position to a single message for the host operating system. Tracking one or more totems with a dedicated signal processor reduces processing demands placed on the host operating system and allows accurate definition of ignore zones and hysteresis related to the totem based upon user interface context. In some use cases, host operating system interaction is avoided by directly interfacing a touchscreen display scalar to command the totem, such as with illumination of commands to a light detector of the totem bottom surface. In such an embodiment, totem battery charge is maintained with a scalar by directing illumination at the totem bottom surface as the totem indicates battery charge as low. Active management at a touchscreen display physical layer, such as with a touch controller, scalar or other embedded controllers reduces latency and improves usability and user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Totem devices resting on a horizontally-disposed touchscreen display interact with an information handling system by adapting touchscreen display operations for detecting touches and presenting visual information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
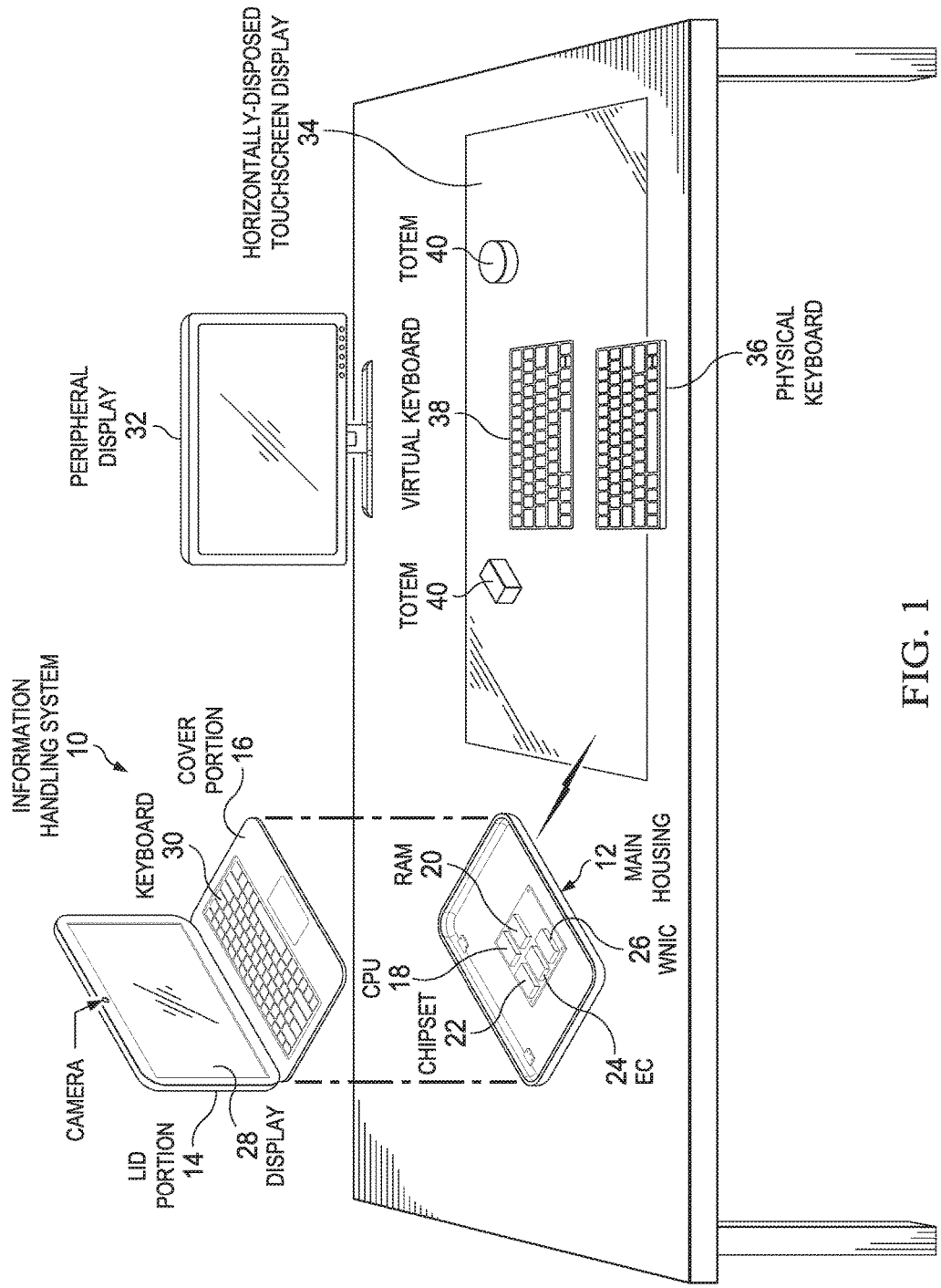
FIG. 1 depicts an information handling system interfaced with a horizontally-disposed touchscreen display having totems disposed on the touchscreen surface.

Referring now to FIG. 1, an information handling system 10 interfaces with a horizontally-disposed touchscreen display 34 having totems 40 disposed on the touchscreen surface. Information handling system 10 of the example embodiment has a portable main housing 12 that contains processing components for processing information and a lid portion 14 rotationally-coupled to the main housing 12. A cover portion 16 fits over the processing components to provide an upper support surface. In the example embodiment, the processing components include a central processing unit (CPU) 18, random access memory (RAM) 20, a chipset 22, an embedded controller 24 and a wireless network interface card (WNIC) 26. During normal operations, CPU 18 executes an operating system that manages interaction with processing components and supports execution of applications stored in RAM 20. Chipset 22 includes a variety of controllers, processors and flash memory to manage operation of processing components on a physical layer. Embedded controller 24, such as a keyboard controller, includes power management logic and accepts inputs from input devices, such as a keyboard, mouse, touchpad or touchscreen. WNIC 26 includes wireless networking devices that communicate with wireless signals, such as wireless local area networks (WLAN), wireless wide area networks (WWAN), and wireless personal area networks (WPAN). In the example embodiment, WNIC 26 supports communication with peripheral devices, such as peripheral display 32, horizontally-disposed touchscreen display 34 and a physical keyboard 36. For instance, information handling system 10 presents visual information at an integrated display 28 of lid portion 14 using an internal graphics link to a graphics controller of chipset 22 and presents visual information at horizontally-disposed display 34 through a wireless interface supported by WNIC 26. In alternative embodiments, various combinations of cabled and wireless interfaces with input and output devices may be used.

The example embodiment of FIG. 1 depicts horizontally-disposed touchscreen display 34 placed on a desktop and communicating with information handling system 10 to accept end user inputs and present visual information. For instance, a virtual keyboard 38 presented on display 34 accepts touches as key inputs and communicates the touches through WNIC 26 to embedded controller 24 so that key inputs are available to an operating system or application executing on CPU 18. As another example, two totems 40 are placed on display 34 so that an end user may communicate touch inputs through totems 40 and display 34 or use by CPU 18. Totems 40 may be implemented in a number of different manners to interact with display 34 and information handling system 10. In one example embodiment, totems 40 are dumb devices that communicate through display 34 only by touches; in alternative embodiments, totems 40 may integrate processing and wireless communication resources that supplement and enhance interactions with information handling system 10. Display 34 presents a user interface related to totems 40 so that the end user manipulates totems 40 for inputs at the user interface. Examples of user interfaces may include a dial interface that accepts user rotation of totem 40 as input values measured relative to a presented dial, or a bar interface that accepts sliding motion of totem 40 as input values measure relative to a presented bar. Generally, totem 40 may provide end user inputs with a variety of usage models, such as by mimicking a mouse or joystick, or interacting in a specific manner with defined applications.

Totems 40 provide a convenient and inexpensive interface device that flexibly adapts to different types of displayed user interfaces, however, accurately detecting and managing totems 40 on touchscreen display 34 can present challenges. Typically end users expect minimal latency for recognition and acceptance of inputs at input devices. Totem devices may provide unique touch signatures on a touchscreen for recognition of the type of totem, however, latency between detection of touches and recognition of a totem device input can result in false marking of inputs at a display near the totem. For instance, touchscreens typically optimize recognition of finger touches based upon a touch area and shape. If a totem 40 only partially touches a touchscreen, the partial touches may not be correctly discerned as part of a totem 40 and instead be interpreted as a finger touch. Where a totem 40 is moved in an uneven manner, such as with partial lifting of some portions of totem 40 of touchscreen display 34, incorrect interpretation of totem touches across the display surface can result in unintended markings and inputs to information handling system 10. The totem 40 environment often is further complicated as an end user hand or fingers engaged with totem 40 incidentally touches touchscreen display 34 resulting in additional detected inputs. In an active end user engagement, available processing resources may become inundated with random and unintentional inputs that overwhelm processing and memory capabilities, leaving end users with an uncertain and confused interface.

Figure 2:
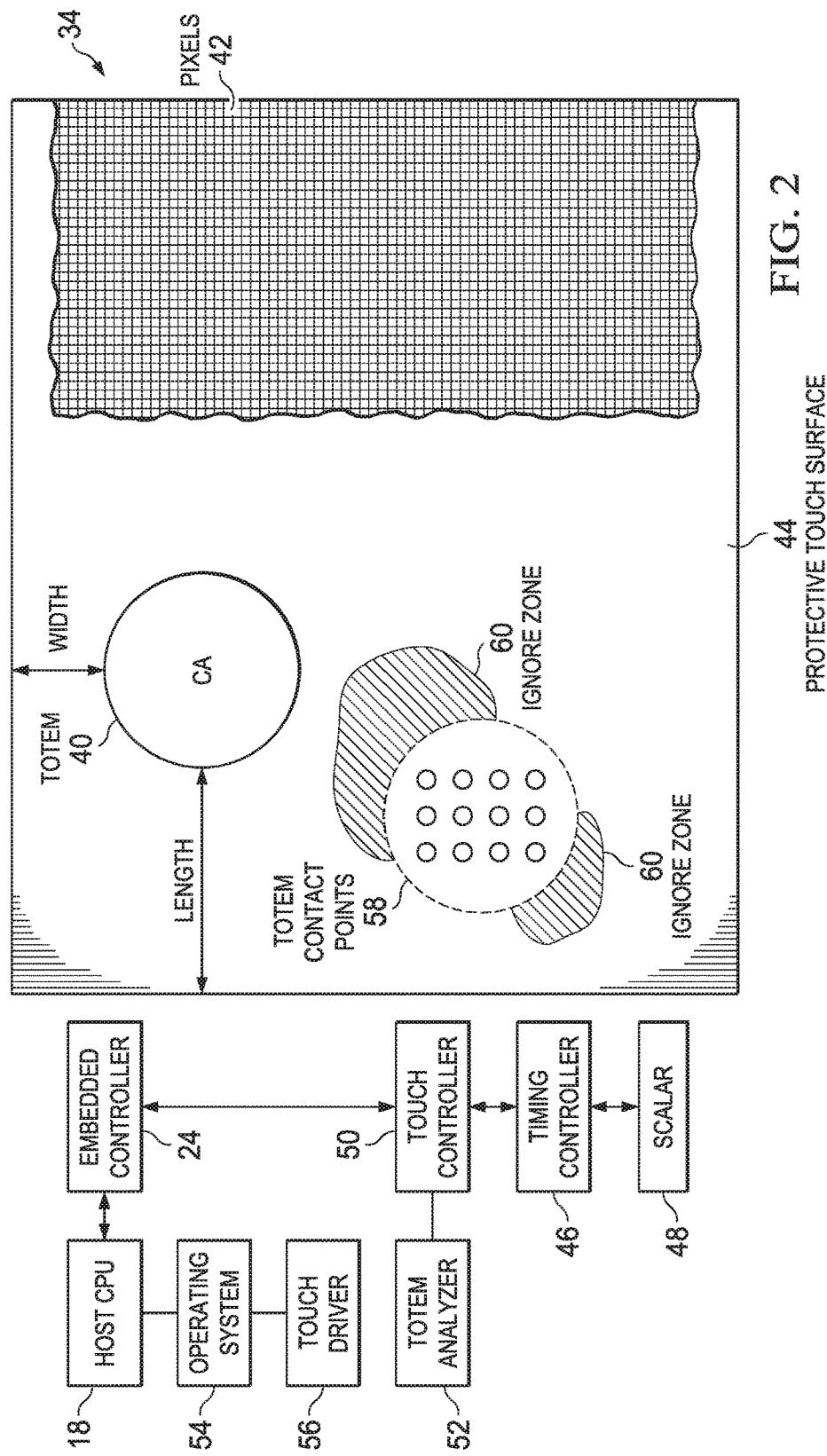
FIG. 2 depicts a block diagram of a system for interfacing totems on a touchscreen display with a host information handling system.

Referring now to FIG. 2, a block diagram depicts a system for interfacing totems 40 on a touchscreen display 34 with a host information handling system 10. In the example embodiment, a host CPU 18 accepts end user inputs from an embedded controller 24 based upon images presented at a touchscreen display 34 by an operating system 54 supporting a touch driver 56. For example, operating system 54 generates a user interface at pixels 42 of display 34 so that touch driver 56 associates detected touches with input values of the user interface. The user interface is passed through a graphics processor and to a timing controller 46 and/or scalar 48 for presentation as pixel values at pixels 42 of display 34. Touchscreen display 34 includes a protective touch surface 44 that integrates capacitive elements to detect touches. For instance, a reference signal passes through capacitive elements of surface 44 and is disrupted to varying degrees based upon the proximity and capacitance of objects near surface 44. The electrical signal passes to a touch controller 50, which determines touch events and passes the touch events to embedded controller 24. For example, finger touches are determined at X and Y (length and width) coordinates of display 34 related to the pixel 42 locations that presented a user interface. Operating system 54 then applies the inputs to the user interface to discern end user input values, such as for an application running over operating system 54.

In the example embodiment, totems 40 resting on protective touch surface 44 generate touch inputs across an area of display 34 that exceeds the area typically associated with finger touches. Conventional touchscreens often filter out large touch areas under the assumption that the touches represent an unintended input, such as a palm or hand instead of the finger touches generally associated with end user inputs. However, totems 40 offer an input interface to touchscreen display 34 that enhances an end user interaction by mimicking a variety of conventional input devices, such as dials and bars adapted to allow hand grasps and movements instead of just finger touches. In order to provide identification of totems 40 and resolution of inputs at totem 40 with minimal latency, totem contact points 58 are placed on a bottom surface of a totem 40 to provide multiple touch contacts within a totem touch area. Touch controller 50 receives signals for protective touch surface 44 based upon the capacitance of the totem contact points 58 and provides the signals to a totem analyzer 52 for resolution of a totem location in length and width at the display 34 and the rotational orientation of the totem relative to the length and width axes. Touch controller 50 then forwards a single location resolution to the operating system as a length, width and rotational orientation set of values for the whole totem touch area. By performing totem touch analysis with totem analyzer 52 using a dedicated processing resource and embedded code, rapid and accurate totem input values are provided to operating system 54 with minimal latency and reduced consumption of host processing resources.

Totem analyzer 52 is, for example, a digital signal processor (DSP) tuned to perform spectral analysis on signals input from protective touch surface 44 to touch controller 50. Rather than attempting to pinpoint and identify multiple touch areas associated with a particular totem, totem analyzer 52 applies spectrum analysis to the touch controller signals so that a totem pattern is detected across the time, frequency and/or phase domains. In the example embodiment, unique frequency domain signatures are created by multiple parallel touch contact points 58 placed along a totem bottom surface. Spectrum analysis by totem analyzer 52 associates a detected signature with a totem type and applies the signature to determine length, width and rotational orientation of the totem 40. Totem analyzer 52 may maintain a library of frequency domain signatures and totem identifiers, or may generate a library by creating totem signatures in a totem configuration routine. For example, an end user places a totem on touch surface 44 an initiates a configuration routine so that totem analyzer 52 captures the totem signature from touch controller 52 in the frequency domain. A unique signature is provided by placing specific geometric patterns of totem contact points 58 on the bottom surface of totem 40. For example, parallel pairs of touchpoints in particular provide readily identifiable signatures responsive to spectral analysis for fast and accurate tracking to totem location rotational orientation. After a spectral analysis signature is found for totem location, the totem configuration routine traces movements and rotations of the totem 40 across display 34 to associate detected signatures by totem analyzer 52 with defined motions. The totem 40 location and rotational orientation are reported to operating system 54 as length, width and rotational orientation resolved from spectrum analysis instead of as a plurality of individual contact points that would consume operating system 54 and CPU 18 resources to resolve.

As another improvement that provides rapid and accurate totem tracking, touch controller 50 enforces ignore zones 60 proximate to totems 40 so that touch surface 44 regions associated with unintended consequences are filtered from touch analysis. For example, ignore zones 60 are defined at locations likely to receive inadvertent finger or palm touches and automatically enforced based upon detection of a totem.

The area and relative location of ignore zones may vary based upon the usage mode detected at touch surface 44. For example, ignore zones 60 are deployed to match likely areas of inadvertent touches for a given user interface projected next to totem 40, such as based upon end user finger, thumb and palm positions relative to totem 40. In one example embodiment, ignore zones 60 may vary based upon an image of touch surface 44 captured by a camera of an information handling system 10 so that the proximity of a user to the totem and the user's intentions impact the size and location of ignore zones 60. In another example embodiment, hysteresis of different lengths are applied for touches in an ignore zone 60. For example, if an end user hand has weight or is captured in an image as placed over totem 40, a longer hysteresis period is applied to touches in ignore zone 60 than if the end user has a finger extended to make inputs at touch surface 44.

Figure 3:
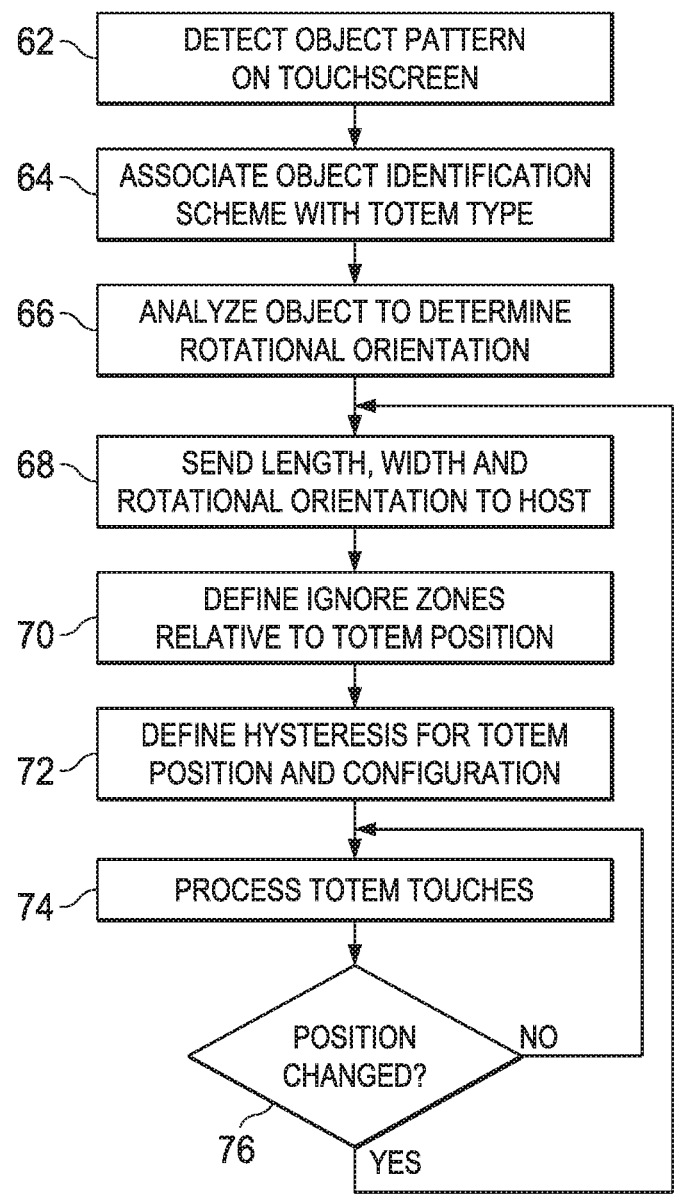
FIG. 3 depicts a flow diagram of a process for defining host information handling system interactions with totems disposed on a touchscreen display.

Referring now to FIG. 3, a flow diagram depicts a process for defining host information handling system interactions with totems 40 disposed on a touchscreen display 44. The process starts at step 62 with detection of object patterns such as plural foot on a touchscreen 40. In one example embodiment, foot detection is performed with a DSP performing spectral analysis on raw signals provided for touchscreen display 44 to capture patterns of capacitive touches in a frequency domain matching known totem types. For instance, placement of plural pairs of feet touchpoints on a bottom surface of totem 40 generates a unique signature as signals sweep over time through touchscreen 40. In alternative embodiments, the touch locations themselves may be individual measured for location on touchscreen 40 and compared against expected locations for known totem types. At step 64, the object identification schemes are associated with totem type to establish a tracking profile of the totem. At step 66, the objects are analyzed for orientation relative to touchscreen 44 to establish a rotational orientation of the totem 40 as an initial starting point. During initial detection of a totem 40, other types of inputs may be applied to provide a more rapid and accurate determination of totem 40 identification, such as images captured by a camera of the totem and totem location.

At step 68, totem 40 position is reported to a host operating system as a length, width and rotational orientation on touchscreen 44. Spectral analysis or similar dedicated processing focused on totem identification and tracking provides a simplified position reporting of totem inputs for the host operating system to handle. For example, each totem identifier includes a single defined central location and rotational orientation based upon relative location of feet or other contact zones disposed at a bottom surface. Totem analyzer 52 applies detected touchpoints to resolve the totem position to the central location and rotational orientation as a length, width and rotational orientation relative to the touchscreen display 44. The host operating system receives the length, width and rotational position information to apply as inputs, and can resolve specific touch points of the totem as needed from the length; width and rotational orientation information. In this manner, the host operating system avoids expending processing resources on resolving totem inputs, which can include complex and rapid position movements. At step 70, once the totem position is resolved, ignore zones are defined relative to the resolved totem position. Ignore zones may be locally determined at totem analyzer 52 or may be communicated from the host operating system to totem analyzer 52. In one alternative embodiment, touch controller 50 continues to process all touches at touchscreen display 44 and provide all touches to the host operating system; however, the host operating system ignores touches that are defined as under or proximate to a totem based upon a totem length, width and rotational orientation. By continuing to provide raw touch data, touch controller 50 offers the host operating system an active interface of touch inputs if needed. For instance, the host operating system may perform a periodic retrieval of raw data to define a more accurate totem signature, and then update the signature used by totem analyzer 52 based upon the analysis. As another example, the host operating system may completely ignore touches defined as located below the totem but monitor touches in other ignore zones to discern unintended from intended inputs. Once ignore zones are defined at step 70, the process continues to step 72 to define a hysteresis for the totem position and configuration, as is explained in greater depth below. At step 74 totem touches are processed according to the defined ignore zones and hysteresis so that at step 76 changes in position are reported at step 68 to the host operating system. Resolution of changes in totem position is determined at totem analyzer 52 for reporting to the host operating system in length, width and rotational position format.

Figure 4:
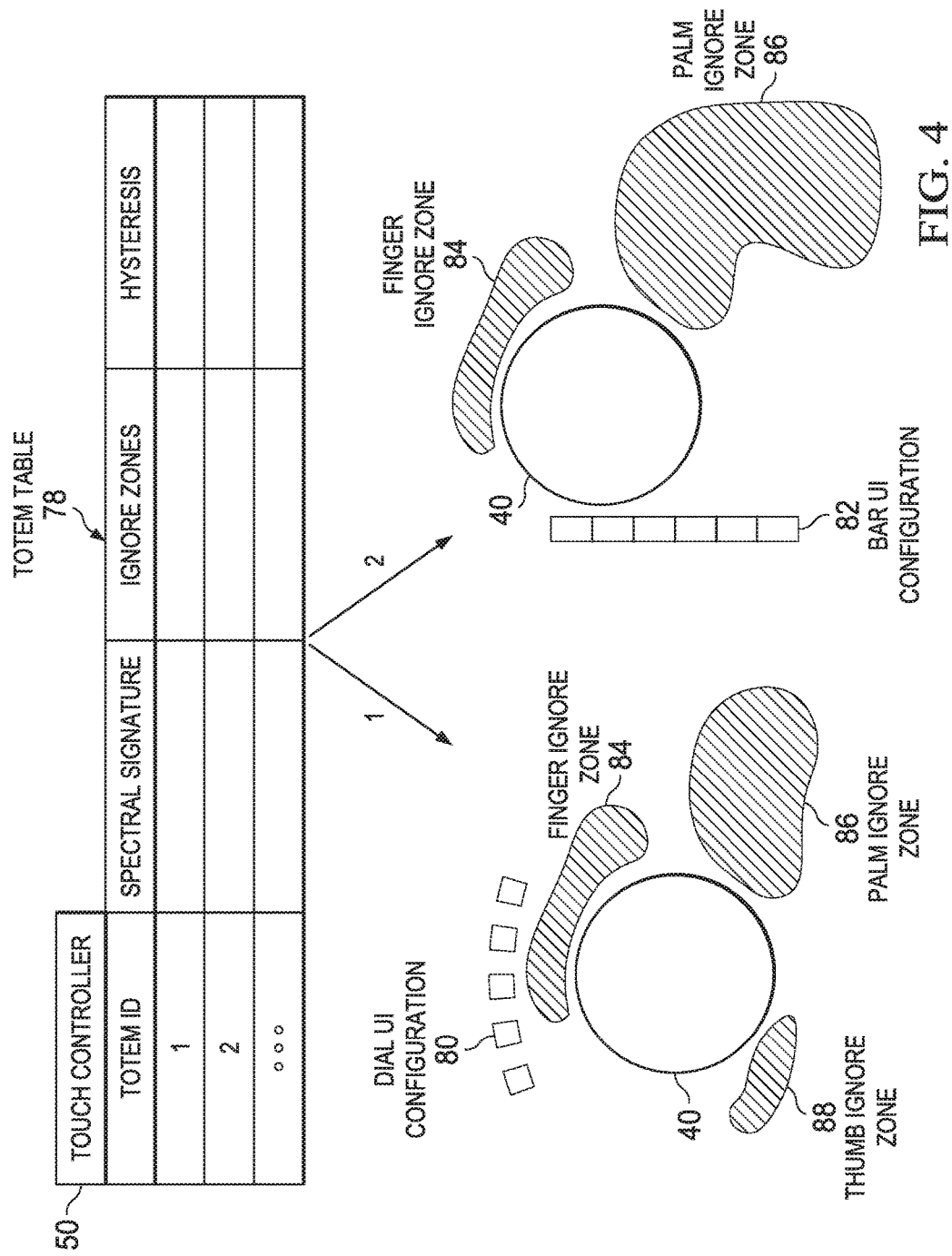
FIG. 4 depicts an example embodiment of a system for tracking interaction settings of totems disposed on a touchscreen display.

Referring now to FIG. 4, an example embodiment depicts a system for tracking interaction settings of totems disposed on a touchscreen display. Tracking multiple totem touchpoints as a group under a single totem identifier improves processing efficiency and reduces input latency, however, the gross position reporting to the host operating system also simplifies processing of additional touches. As an example, manipulation of a totem can result in temporary lifting of touchpoints of the totem in an irregular pattern that may alter a display user interface as the totem presence is detected and then disappears. The temporary removal of sonic totem touchpoints from a touchscreen display 44 followed by full placement of totem touchpoints can introduce additional latency as totem presence is de-registered and re-registered with each movement. As another example, partial placement of a totem of the touch surface may result in presentation of inadvertent and unintended touches as the totem recognition is effected and removed. Bifurcation of totem touch analysis between a dedicated totem analyzer and a host operating system reduces latency and incorrect intermediate touch readings by allowing host or dedicated processing of totem detection with hysteresis based upon totem configuration and position.

In order to improve totem location processing, touch controller 50 maintains a totem table 78 that tracks detected totems based upon a totem identifier. Touch controller 50 stores the location of the totem for a hysteresis time period so that temporary touchpoint lift off and touchscreen noise do not create inaccurate inputs, in one embodiment, touch controller 50 implements the hysteresis by storing inputs in a totem location for a hysteresis period of time whenever detected touches transition from those matching a totem to other types of touches. If before expiration of the hysteresis time period the totem is again detected at the location, then a temporary liftoff of one or more totem touch points is assumed and the intermediate touches are discarded. In contrast, if the hysteresis time period expires without detection of the totem at the totem location, the intermediate touches are applied as intended touches and forward to the host operating system. In an alternative embodiment, hysteresis is managed at the host operating system by immediately forwarding touches not identified with a totem to the operating system to process. For example, a liftoff of one or more touchpoints of a totem results in totem analyzer 54 removing the group of touches as associated with a totem so that individual touches of the remaining totem touch points are forwarded to the host operating system; however, the host operating system applies the hysteresis before processing the touches as individual inputs instead of totem touches. In various embodiments, responsibility for determining the association of a group of touches to a totem versus to individual touches is allocated between various hardware and software components in the chipset, CPU, embedded controller, touch controller, BIOS and operating system to provide balance between responsiveness to touch inputs and consumption of processing resources. For example, forwarding touch inputs to the host operating system during hysteresis time periods allows preprocessing of the inputs in the event a totem is not subsequently detected.

Totem table 78 of FIG. 4 provides a number of configuration options for totem identifiers to enforce ignore zones and hysteresis based upon a context at the user interface. In the example embodiment, a dial user interface 80 accepts inputs from totem 40 by a rotational movement of totem 40. Totem 40 has an ID of "1" that defines a spectral signature, ignore zones and hysteresis based upon a probable usage model. Since the dial user interface is associate with rotation of totem 40, ignore zones defined proximate totem 40 relate to probable use of totem 40, such as a finger ignore zone 84 along the upper perimeter of totem 40, a palm ignore zone 86 along at the lower side of totem 40, and a thumb ignore zone 88 at a corner periphery location. A second totem 40 has an ID of "2" that defines a spectral signature used with a bar user interface configuration 82 that moves the totem 40 across a length or width of touchscreen display 44. A finger ignore zone 84 has a length that provides for movement of fingers in association with lateral movement of the totem 40, and the palm ignore zone 86 has a similar length to address anticipated sliding of the palm has a totem 40 is moved laterally. Touch controller 50 adapts inputs proximate totems 40 to use spectral signatures, ignore zones and hysteresis that dynamically configure to usage models appropriate for the context, such as by adjusting hysteresis to have a shorter time period where small totem movements are expected and a longer time period where larger movements are expected and have an increased likelihood of lifting totem touch points off of a touchscreen.

Figure 5:
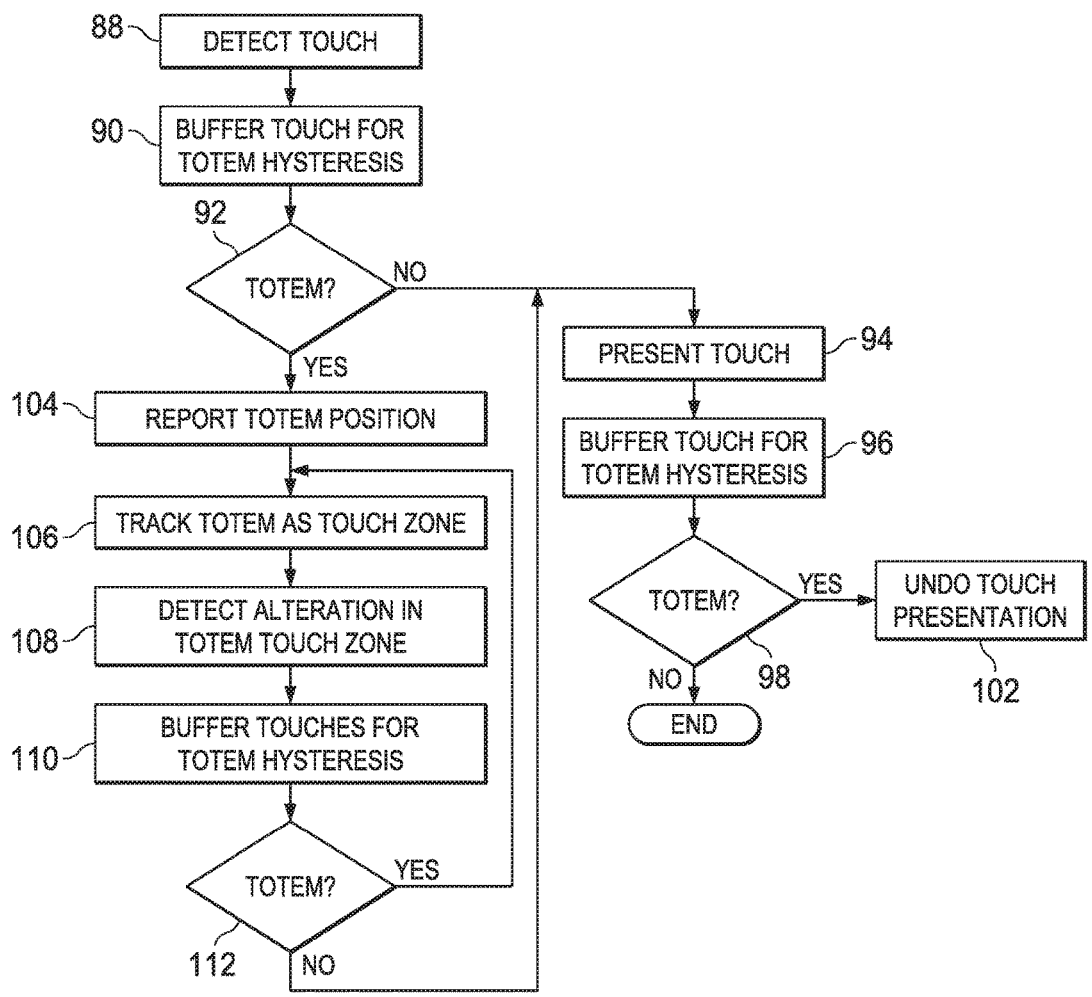
FIG. 5 depicts a flow diagram of process for adapting totem input responsiveness based upon totem usage states.

Referring now to FIG. 5, a flow diagram depicts a process for adapting totem input responsiveness based upon totem usage states. The process starts at step 88 with detection of touches at a touch screen. At step 90, the touch is buffered for totem hysteresis so that some time passes before the touch is applied as an input. At step 92 a determination is made of whether the detected touches are associated with a totem, such as if a spectral analysis of the touches matches a stored totem spectral signature. If a totem is not detected at step 92, the process continues to step 94 to present the touch at the touchscreen display or otherwise process the touch as an input. At step 96, subsequent touches are buffered for the totem hysteresis to continue to monitor touches for association with a totem device. At step 98, after a sufficient number of touches are compared with the totem signature without detecting a totem, the process ends at step 100 to accept the touches as normal touch inputs. If at step 98 a touch is associated with a totem after hysteresis has passed, the process continues to step 102 to undo the touch presentation or input.

If at step 92 a totem is detected, the process continues to step 104 to report the totem position. Totem position is reported as a single location of length, width and rotational orientation relative to the touchscreen display dimensions. The single location relates to a known totem footprint so that the host operating system can determine actual totem coverage of the touchscreen display from the single location. In this manner, the host operating system presents user interfaces related to the totem, such as the dial and bar user interfaces, at the periphery of the totem footprint. At step 106, the totem position is tracked as a touch zone that reports the single position to the host operating system, such as a length, width and rotational orientation position. The totem is tracked as a gross touch area by reference to the spectral signature of the totem on the display rather than by reporting individual touch points of the totem to the host operating system. At step 108, motion of the totem is detected with an alteration in the position of the totem touch zone. At step 110, the touch position of the totem is buffered for a hysteresis time period to reduce the risk of inaccurate readings introduced by noise or that a removal of the totem has occurred. If at step 112 the totem is still indicated at the touchscreen display, the process returns to step 106 to track the new totem position. If the totem has been removed or is otherwise not tracked as an appropriate signature, the process returns to step 92 to analyze the touch.

As is depicted by FIG. 5, totem hysteresis adapts to different time periods based upon a number of different factors, including the type of totem, the user interface configuration relative to the totem, the relative position of the totem to the touchscreen display and the anticipated end user interactions. For instance, before placement of the totem on the touchscreen display, a hysteresis is applied for a first time period to all touchscreen detected touches. Once a totem is detected, a different hysteresis time is applied for movements associated with the totem than for other touches. For example, detection of a spectral signature associated with a totem can provide an increased accuracy for totem location that reduces the need for extended hysteresis to filter inadvertent movements. As another example, an increased hysteresis time may apply if a totem signature is lost at a touchscreen display since an increased chance for inadvertent or noise-type touches increases during placement and removal of a totem. Application of independent hysteresis periods is simplified where dedicated spectral analysis processing to identify and track totems provides single location identification and reporting for a totem.

Figure 6:
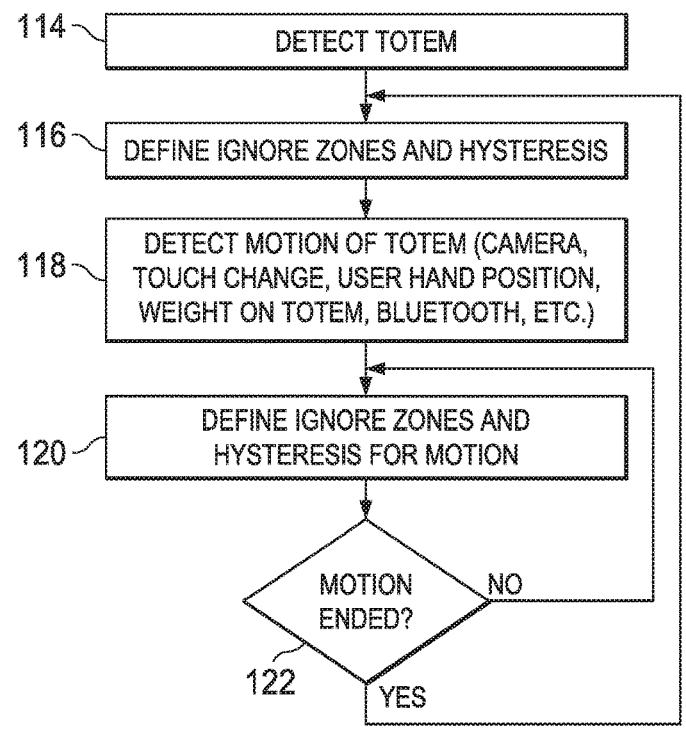
FIG. 6 depicts a flow diagram of a process for adjusting totem responsiveness based upon totem motion.

Referring now to FIG. 6, a flow diagram depicts a process for adjusting totem responsiveness based upon totem motion. Responsiveness is adapted by adjusting both the ignore zones and the hysteresis assigned to a totem based upon context. As an example, defining a broader ignore zone and ignoring totem motion until the motion breaches an ignore zone boundary provides greater assurance that a movement of the totem is intended. If a bar type user interface is involved, varying the size of the ignore zone based upon expected movements in essence adapts hysteresis of the totem to the direction of movement of the totem. For example, a greater movement of a totem is required to breach an ignore zone in a direction of movement that is not expected while a smaller ignore zone is breached more quickly in a direction of movement that is expected. A combination of varying ignore zone sizes and varying hysteresis time periods based upon touchscreen context provides adaptive behavior for totems independent of other touch input detections. As another example, a context for establishing totem ignore zones and hysteresis is the proximity of a totem to a boundary of a touchscreen display so that inaccuracies related to movement of the totem off the touchscreen display are better managed.

At step 114, a totem is detected, such as with spectral analysis searching for totem signatures based upon unique dispositions of parallel touchpoint feet pairs on a totem bottom surface. At step 116, ignore zones and hysteresis are defined for the totem based upon the totem context. At step 116, detection of motion of the totem is performed with analysis of touches or other indicia, such as camera images of the touchscreen display surface, user hand positions detected on the touchscreen, weight placed upon the totem or Bluetooth signals such as may be sent in response to detection of accelerations at the totem by an integrated accelerometer. Upon detection of motion, the process continues to step 120 to define ignore zones and hysteresis based upon the change in context introduced by the motion. For example, if an intended end user movement is confirmed by multiple indicia, a more responsive totem input may be configured with reduced ignore zone size and hysteresis. In contrast, if other indicia point to an unintentional input, such confirmation that the end user hand is away from the totem, then a larger ignore zone and hysteresis may be applied. At step 122 a determination is made of whether motion has completed. If not, the process continues to monitor context at step 120 to adapt totem responsiveness. If motion is completed, the process returns to step 116 to define a stationary context for the ignore zones and hysteresis.

Figure 7:
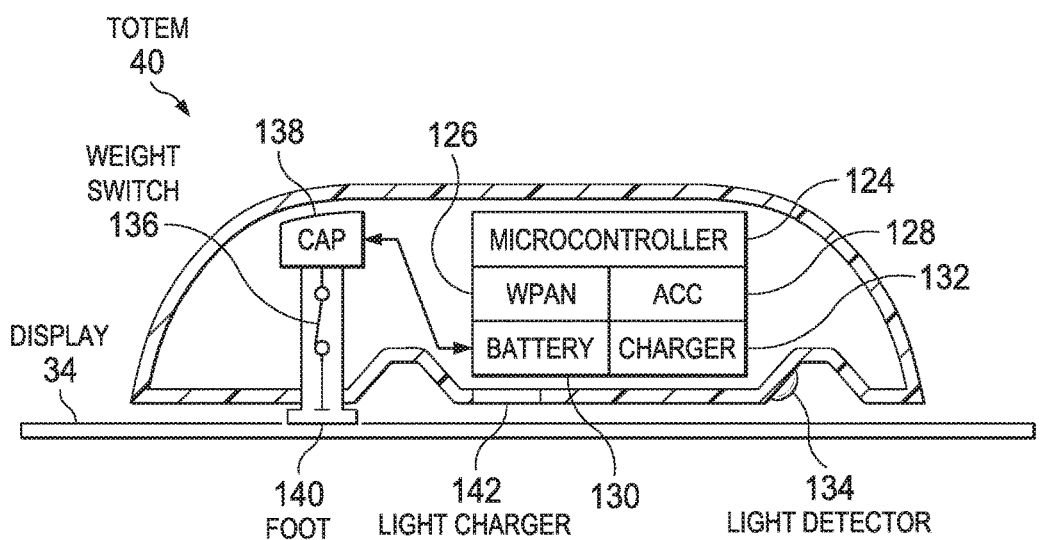
FIG. 7 depicts a side cutaway view of a totem having touch contact points with variable capacitance and having interactions with light output at the display.

Referring now to FIG. 7, a side cutaway view depicts a totem having touch contact points 140 with variable capacitance and having interactions with light output at the display. In the example embodiment, capacitance of a foot 140 is adjusted based upon a position of totem 40 by bring a capacitance source 138 selectively into contact with foot 140 based upon context, such as weight resting on totem 40. For example, hand pressure overcomes an upward bias of a weight switch 136 so that capacitance source 138 electrically interfaces with foot 140. When a conductive path is opened between capacitance source 138 and foot 140, the capacitance at the touch pad increases to provide an enhanced touch input signal strength associated with foot 140. The totem analyzer looks for amplitude associated with the touch foot 140 that indicates presence of a weight at totem 40 before "activating" totem 40. As set forth above, weight on totem 40 introduces a context that indicates an increased likelihood of an end user input, so detection of the weighted capacitance touch results in setting of ignore zones and hysteresis for a pending end user input based upon the input context, such as the user interface presented at the touchscreen display.

In the example embodiment depicted by FIG. 7, totem 40 includes some intelligence that supports communication with a host information handling system in ways other than touches at a touchscreen display. A microcontroller 124 executes embedded code that manages a wireless personal area network (WPAN) such as Bluetooth, an accelerometer 128 and a charger system 132 that charges an integrated battery 130. Active communication through a wireless interface may provide a basis for transitioning between different ignore zone and hysteresis configurations. Battery 130 provide current to power microcontroller 124 and receives charge from charger 132 based upon conversion of light energy provided from the touchscreen display with a light sensor/charger 142. Other light detectors 134 deployed at different angles and locations on the bottom surface of totem 40 provide microcontroller 124 with indications of light output from the touchscreen display, such as the color or intensity of light in a particular positions along the bottom surface of totem 40. In this manner, a host operating system manages control of totem 40 functions by sending commands to totem 40 with light signals presented from beneath totem 40. For example, a touchscreen display presents light at a defined location, color, intensity or flashing on and off so that signals generated by light detector 134 and communicated to microcontroller 124 includes command information related to functions of totem 40, such as haptic feedback, charging of battery 130 or definition of a relative rotational orientation. The host operating system applies the totem location information and totem footprint information to define illumination only below the totem so that the communication and charging functions remain hidden from an end user.

A variety of functions become available with bi-directional totem communication supported through illumination of a display detected by a light sensor. One example is registration of totems with a passive and non-wireless communication. For example, if a host information handling system detects multiple totems on a touchscreen display, the host can confirm the identity of each totem by illuminating beneath each totem in turn and getting feedback from the totems, such as with a wireless confirmation or a haptic response at the totem. As another example, a totem relative orientation may be determined by illumination of the display at specific locations relative to the totem so that light sensors disposed in different quadrants of the bottom surface of the totem detect the light and place the totem rotational position. As another example, a totem that has a battery requests battery charge with a wireless or haptic indication so that the host operating system provides illumination at a bright setting. In one example embodiment, information sent by illumination under a totem provides for automated Bluetooth pairing between the totem and a host information handling system, such as by sending an encryption code with the illumination. In various other embodiments, other types of functions may include implementation of a rotational encoder that uses light to determine rotational orientation, a button press response to the totem based upon an illumination started from the host, totem status feedback and haptic feedback triggering in which a haptic response is initiated at the totem from illumination under the totem by the host operating system.

Figure 8:
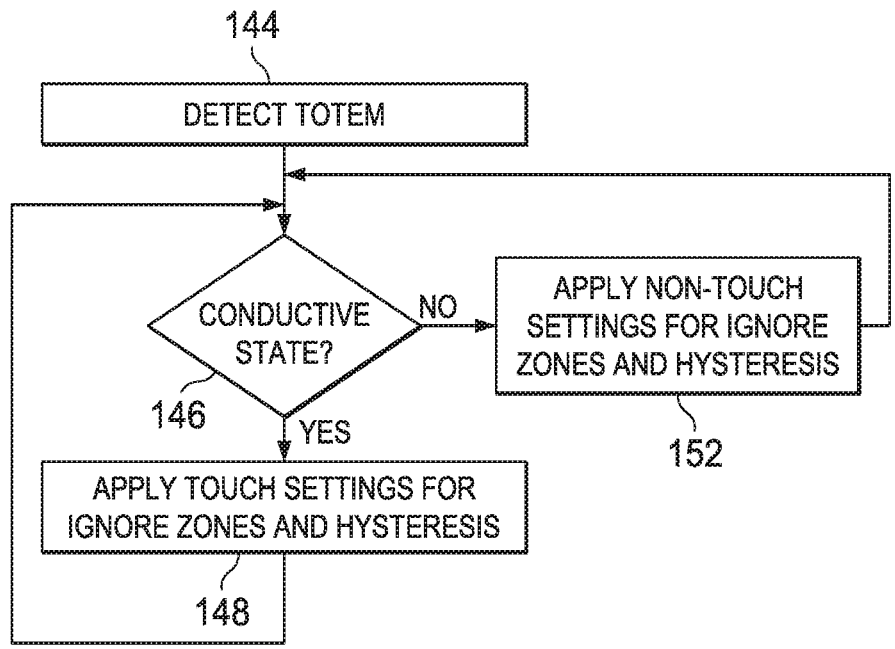
FIG. 8 depicts a state diagram of totem settings based upon detected weight placed upon the totem.

Referring now to FIG. 8, a state diagram depicts totem settings based upon detected weight placed upon the totem. The process starts at step 144 with detection of the totem on the touchscreen display. At step 146, a determination is made of whether the detected totem is in a conductive state or a non-conductive state. For example, a conductive state is established when pressure on the upper surface of the totem presses weight switch 136 to interface a capacitive source 138 with a foot 140. A non-conductive state exists when a foot 140 is detected as a touch having a lower capacitive reading at the touchscreen. In one embodiment, rapid recognition of conductive state is provided by recognition of a spectral signature at the touchscreen display having increased amplitude associated with greater capacitance of the touching foot and or feet. If a step 146 a non-conductive state is detected, the process continues to step 152 to apply non-touch settings for the ignore zone and hysteresis of the totem. If at step 146 a conductive state is detected at the totem, the process continues to step 148 to apply touch settings for ignore zones and hysteresis of the totem. The precise settings for a particular non-touch or touch totem will depend upon context of the totem, such as the expected inputs or usage model associate with the totem. Although FIG. 8 depicts a passive communication of anticipated use by a totem through manipulation of capacitive features of the totem feet, in alternative embodiments, alternative active communication could be used.

Figure 9:
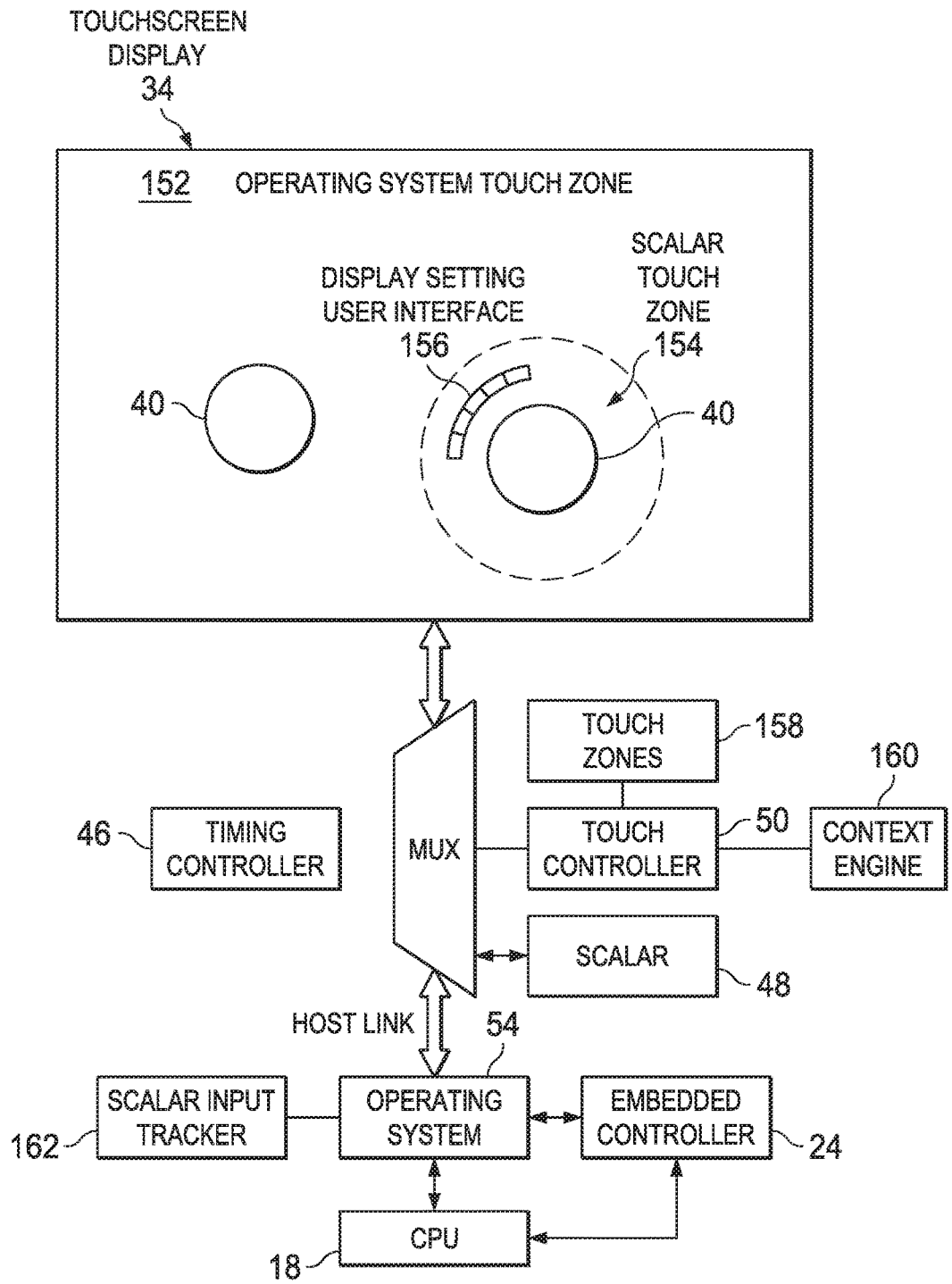
FIG. 9 depicts a block diagram of totem interactions managed locally at a touchscreen display scalar.

Referring now to FIG. 9, a block diagram depicts totem 40 interactions managed locally at a touchscreen display 34 scalar 48. Typically display 34 settings and management are performed at a host information handling system, such as through a graphics processor managed by an operating system. However, if an operating system is unavailable or communication has latency, coordination of inputs made at a display 34 through the operating system and back to the display controller, such as timing controller 46, can introduce latency that detracts from system responsiveness. In order improve system responsiveness related to totem inputs, the example embodiment in FIG. 9 relies upon scalar 48 support of touch inputs related to touchscreen 34 and totem 40 interactions. For example, touch controller 50 includes embedded code that maintains a communication interface with operating system 54 while re-routing totem 40 and touchscreen 34 activities to scalar 48. Scalar 48 includes a microcontroller that parses touch events to selectively map touch events to appropriate inputs at touchscreen 34 that are implemented locally. For example, scalar 48 selects totem touch inputs associated with display settings to apply the display settings locally without direction from operating system 54. Display settings may include display brightness, contrast, menu, function and power settings that generally apply to the display image across all pixels. In some embodiments, display settings routed to scalar 48 for application locally at display 34 are also forwarded to operating system 54 so that specific applications executing on the information handling system may adjust visual image output responsive to the display settings. For instance, scalar 48 adjustment of gamma at display 34 based on inputs made at a totem 40 and routed directly to scalar 48 will also have the gamma setting forwarded to the host information handling system so that applications running over operating system 54 may adapt their color gamut to the selected display gamma. In one embodiment, touch controller 50 simply forwards all totem related touches to both scalar 48 and host operating system 54 so that each can handle touches as appropriate.

FIG. 9 depicts an example embodiment with touchscreen display 34 having totems 40 deployed in defined zones that have inputs selectively managed by an operating system 54 or a scalar 48. A first totem 40 rests in an operating system touch zone 152 so that touches made at the totem 40 are forwarded as position reports to operating system 54. A second totem 40 rests on a scalar touch zone 154 so that touches made at the totem 40 are instead managed locally by scalar 48. In the example embodiment, a display setting user interface 156 is presented proximate the second totem to direct end user display setting inputs, such as brightness and contrast. For example, the display setting user interface may be presented under the management of operating system 54 or as an integrated interface of scalar 48 or timing controller 46. Touch zones are defined in a touch zone table 158 that defines which portions of the touchscreen are designated to accept operating system versus scalar inputs. A context engine 160 manages the touch zones and the totem settings based upon the context detected at the touchscreen display. As touch controller 50 detects touches, the touches are forwarded through a physical or logical multiplexor so that scalar 48 or operating system 54 manages the touches as inputs. For example, touches detected in operating system touch zone 152 are ignored by scalar 48 and managed by operating system 54. In contrast, touches detected in scalar touch zone 154 are managed by scalar 48 while operating system 48 may or may not select to receive and address the inputs. For instance, operating system 48 may accept touches that were made in scalar touch zone 154 to keep track of display settings.

Figure 10:
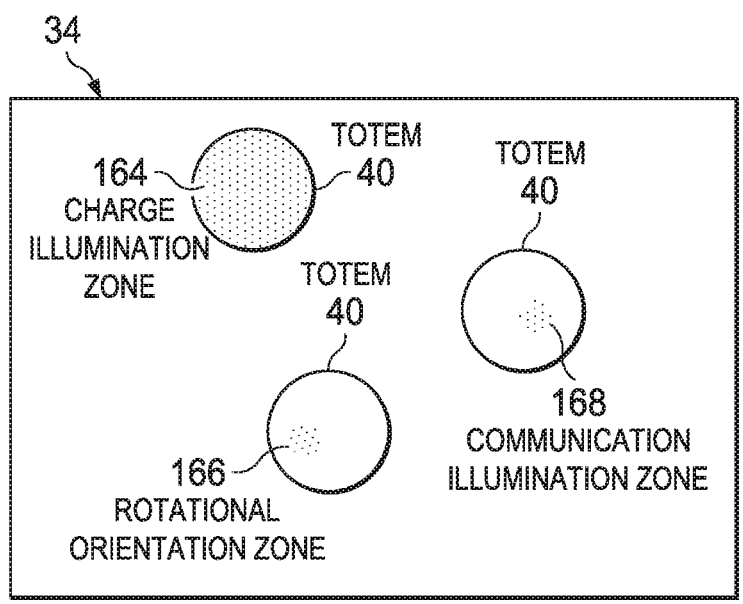
FIG. 10 depicts a touchscreen display having illumination zones managed to interact with a totem.

Referring now to FIG. 10, a touchscreen display 34 is depicted having illumination zones managed to interact with a totem 40. In the example embodiment, three example illumination zones are depicted. A charge illumination zone 164 is established below a totem 40 having a solar cell or similar light-to-current converter that converts display illumination into a power source for components within a totem 40. A rotational orientation zone 166 has illumination provided in a specific portion of the totem footprint so that light detectors disposed in the totem will detect stronger light if located closer to the illuminated portion. A communication illumination zone 168 provides illumination in a predefined illumination color, intensity or timed pattern to communicate information to totem 40 from a local display controller, such as scalar 48, or the host operating system 54. In operation, totem 40 management at display 34 may be handled by local display control or operating system control based upon the function involved and the display-to-host connection state.

In one example embodiment, totem 40 communicates a low battery charge to display 34 with a Bluetooth command, a haptic vibration, or a change in capacitance at one or more of plural feet. The request for a charge is handled by operating system 54 if totem 40 is located in an operating system tracking zone 152 and is handled by scalar 48 if totem 40 is located in scalar touch zone 154. If display 34 does not have an active interface with a host operating system, scalar 48 manages all totem communications. Upon receipt of the request for charge of the low battery, display 34 illuminates charge illumination zone 164 to provide illumination that charges the battery. Charge illumination zone 164 may be sized and located based upon the central location reported for the totem and the stored footprint of the totem 40. Alternatively, charge illumination zone 164 is located based upon analysis of individual touches at display 34 that define the boundary of totem 40. In one embodiment, charge illumination zone 164 is reduced in size if ambient light conditions are low, such as where light escaping from underneath totem 40 may disrupt an end user working environment having a darkened room.

In another example embodiment, totem 40 responds to communications from scalar 48 or host operating system 54 sent with illumination below totem 40. For instance, if a host operating system 54 desires to know the relative rotational orientation of totem 40, illumination in a rotational orientation zone 166 provides illumination at a rotational orientation that results in current generation at a light sensor located near the illumination. Totem 40 provides the relative location of the illumination with a Bluetooth, haptic or capacitive feedback. Similarly, if scalar 48 or host operating system 54 desires to command a response at a totem 40, such as a haptic response, communication illumination zone 168 is established below the totem 40 to send illumination that includes the command. For example, display 34 illuminates commands with ones and zeroes by sequencing illumination in a timed pattern. As another example, plural communication illumination signals may be provide below a totem 40 to help establish a more reliable signal, such as by using one communication illumination zone as a timing signal while sending ones and zeroes through the other communication illumination zone.

Figure 11:
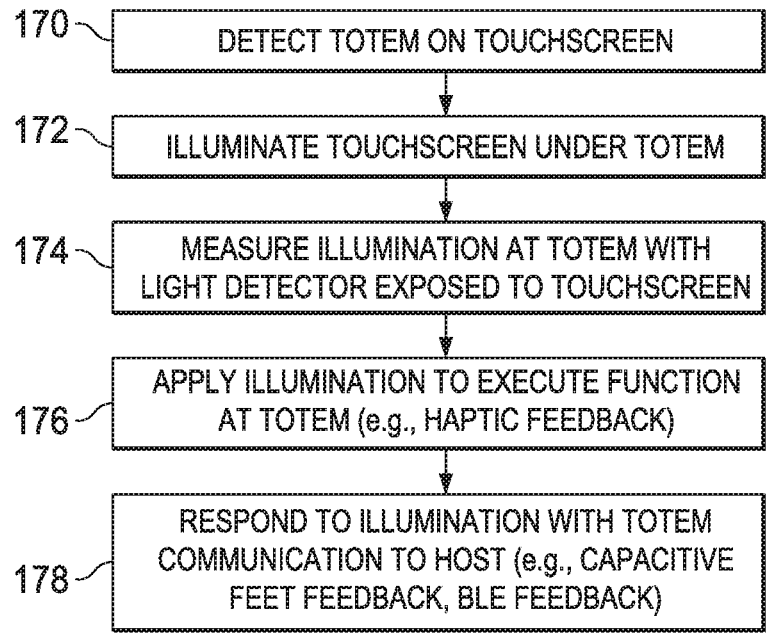
FIG. 11 depicts a flow diagram of a process for communicating with a totem using illumination at the totem bottom surface.

Referring now to FIG. 11., a flow diagram depicts a process for communicating with a totem using illumination at the totem bottom surface. The process starts at step 170 with detection of the totem on the touchscreen display. The totem location may reflect resolution of the totem analyzer using spectrum analysis and application of stored totem footprint specifications or independent confirmation of the totem position with analysis by a host operating system of independent touch information provided from the touch controller. For example, calibration of totem footprint specifications may be performed by the operating system with comparison of expected and detected touches by the touch controller proximate the ignore zones. At step 172, display 34 illuminates under the totem position with a predefined color, intensity or timed light pattern. Initial illumination may calibrate the light intensity for the totem that the totem will receive from the display 34 as inputs. For example, many displays 34 will have a maximum intensity level available that will produce a different current response at the totem. Initial illumination provides a baseline for input illumination levels that adapt the totem to different displays and also allow a particular display to use a lower illumination if desired. At step 174, light sensors at the totem bottom surface convert detected light to current that is in turn provided to a microprocessor operating on the totem. At step 176, the totem microprocessor applies detected illumination to execute functions associated with commands communicated by the detected illumination. As set forth above, some examples of commands include establishing encrypted Bluetooth communication by sending a key, initiating a haptic feedback at the totem by powering a vibration device integrated in the totem, establishing a relative rotational orientation of the totem and initiating charge by illumination provided to a totem solar cell exposed at the totem bottom surface. At step 178, where appropriate totem 40 responds to the illumination command by performing the function or by acknowledging the command with a response that indicates the command was received an executed.

Figure 12:
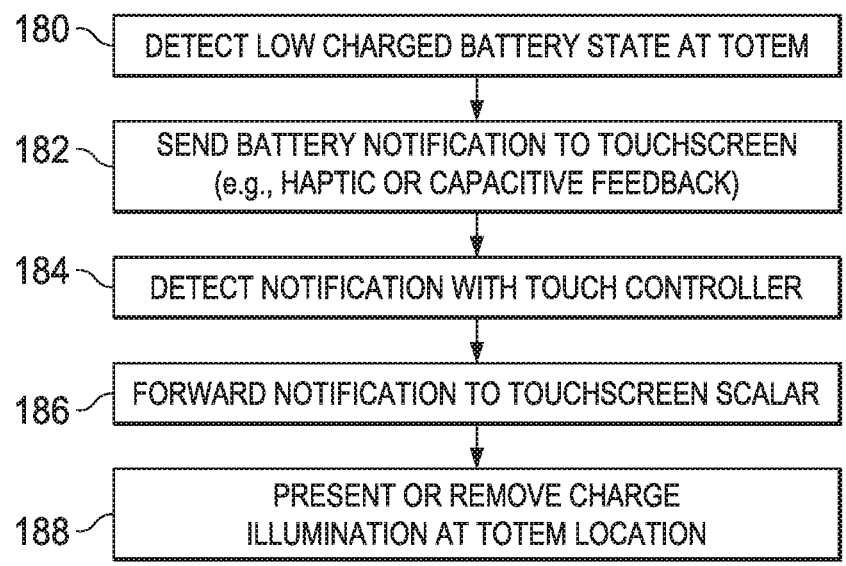
FIG. 12 depicts a flow diagram of a process for coordinating charge of a totem battery with touchscreen display illumination.

Referring now to FIG. 12, a flow diagram depicts a process for coordinating charge of a totem battery with touchscreen display illumination. The process starts at step 180 with detection of a low battery charge state at the totem. At step 182 a battery low notification is communicated to the touchscreen, such as with a Bluetooth, haptic or capacitive feedback. At step 184, the notification is detected by the host operating system, such as by receiving a Bluetooth message or a capacitive input through the touch controller that is initiated by a capacitive foot capacitance change or haptic input. At step 186, the low battery charge information is forwarded to the touchscreen display scalar so that at step 188 the scalar presents illumination in the charge illumination zone for establishing current from the totem solar cell to the battery charger.

Figure 13:
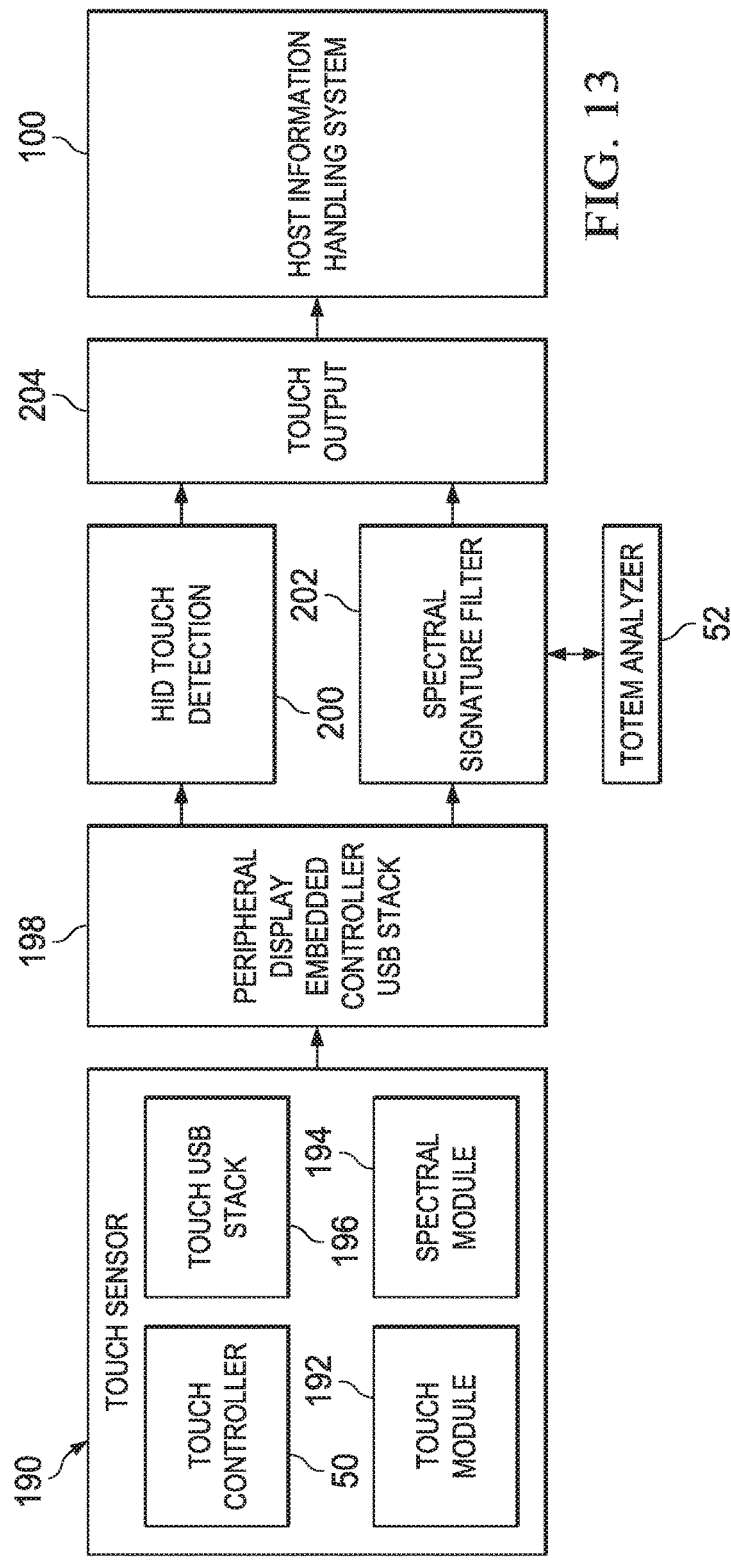
FIG. 13 depicts a block diagram of a system for detecting a totem spectral signature.

Referring now to FIG. 13, a block diagram depicts a system for detecting a totem spectral signature. In various embodiments, touches at a touch surface are detected with various types of analog signal analysis. Generally an object proximate the touch screen alters mutual coupling between row and column electrodes or an absolute capacitance increases capacitance to ground. A sequential scan of the electrode positions detects touches based upon differences in capacitance over time. When a totem is placed upon a touch sensor surface, an area of the size and shape of the totem generates capacitance detectable by a touch controller, however the processing involved in comparing a touch area to an expected totem footprint based upon touch positions can lead to latency in totem detection, especially if the totem identification is performed at a host operating system level. Sufficient processing power and memory capacity is required to digitize touch points from analog sensors within the touchscreen, filter these points appropriately, swiftly identify single finger touch points, swiftly identify simple large objects such as circles, identify and reject palm/forearm/large object irregular shapes, identify potential large object regular shapes for spectral analysis. Spectral analysis of the digitized signals is compute intensive, however, a dedicated digital signal processor handles the computations rapidly to send a resolved totem position that removes processing workload from the host operating system. The same algorithms used within the touch controller to spectrally identify totems can also be run within the host system processing the digitized object data that represents unknown objects on the touchscreen, relying on the host system to reject the object or identify the object as a unique totem. A totem outline is normalized and then extrapolated to complete a pseudo-frequency table that reflects an outline of a binary object as a complete single period amplitude sweep. A frequency windowing expansion is executed in order to allow appropriate mathematical extents that identify a totem spectral signature. The frequency window results in a repeatable output set of points with amplitude per frequency based upon totem contact regions. A pure single sine wave results in a single frequency output so that an object matching a single sine wave creates a single frequency with no side band components. Matching a spectral signature to a totem permits rapid position reports based upon length, width and rotational orientation that effectively filters the totem touches from processing by the algorithms running either on the embedded touch controller or the host operating system.

In the example embodiment, touch sensor 190 includes a touch controller 50 that detects touch positions on a touch device, such as a touchscreen display or capacitive mat. The touch position analog signal is monitored by a touch module 192 that reports capacitive values related to touches based upon the detected touch positions. A spectral module 194 also monitors the touch position analog signal for spectral signatures associated with a totem position. For example, spectral module 194 monitors an analog signal sweep across the touchscreen display for a frequency, phase and amplitude associated with totem touch areas. Touch module 192 and spectral module 194 report detected touches to a touch USB stack 196 for communication from touch sensor 190 to a host system.

A peripheral display embedded controller USB stack 198 receives from touch sensor 190 the touch detection of touch module 192 and the spectral signature of spectral module 194. Detected touches are forwarded to an human interface device (HID) detection handler 200 for resolution by the host system. Spectral signatures are forwarded to a spectral signature filter 202 for analysis to compare with possible totem spectral signatures. Totem analyzer 52 reports totem matches to spectral signature filter 202, such as with a resolution of totem type and position based upon the detected spectral signature. A touch output module 204 combines the touch and totem detection to output to host information handling system 10 resolved positions for use at an application layer. In one embodiment, totem spectral signatures are applied to filter out touches provided by HID touch detection module 200 that fall within a totem spectral signature area. Alternatively, individual touches provided by HID touch detection module 200 are compared with totem spectral signature areas to confirm the detected totem.

Figure 14:
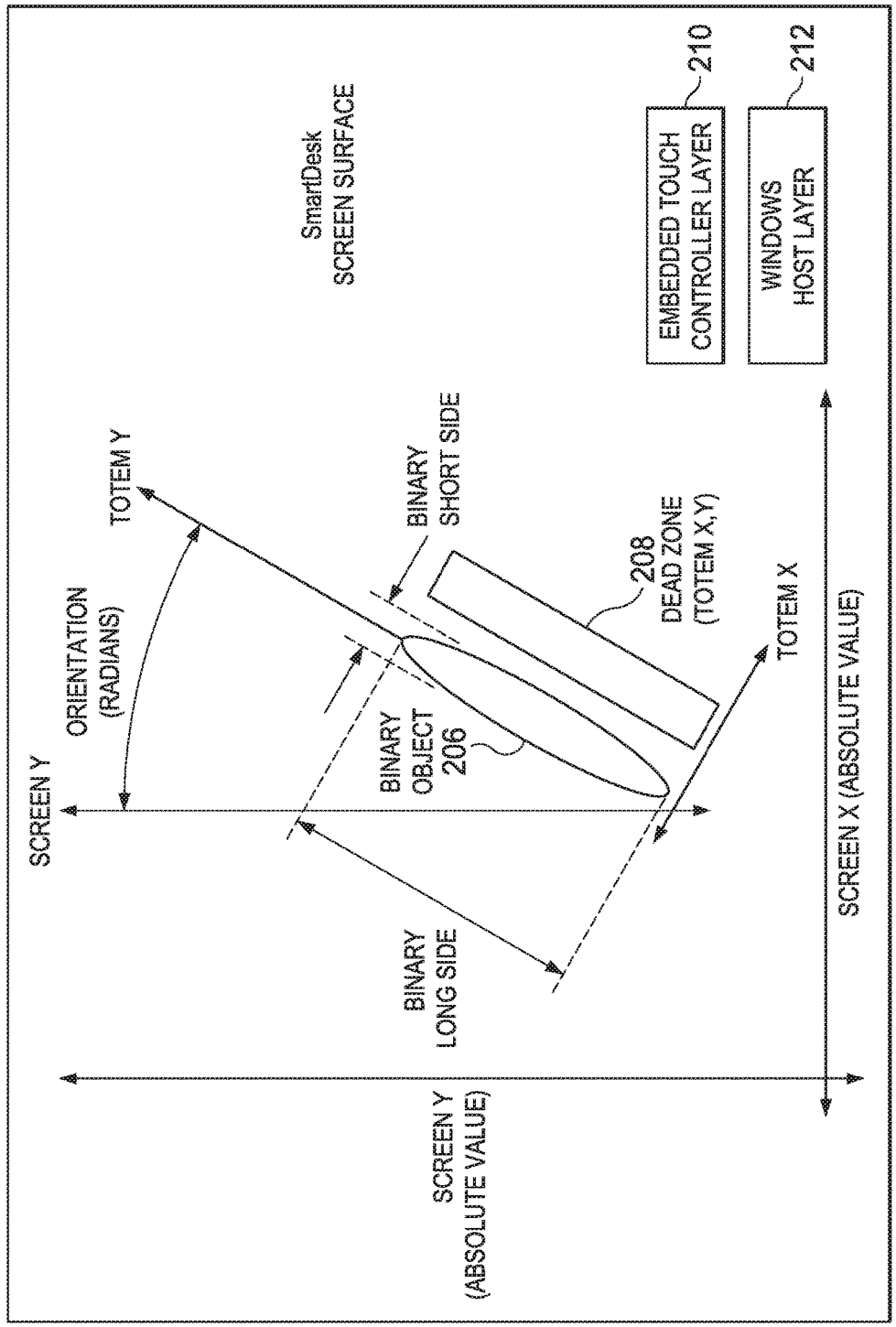
FIG. 14 depicts an example embodiment of a totem position solved from spectral analysis.

Referring now to FIG. 14, an example embodiment depicts a totem position resolved from spectral analysis. In the example embodiment, a totem touch region 206 extends along a totem bottom surface in an oblong shape that resolves in an embedded touch controller layer 210 to a length, width and rotational orientation position. A host detection layer 212 has a dead zone 208 defined by relation to the totem position 206 to reduce host touch processing. Although depicted as a single touch region, totem touch region 206 may include individual touch positions within the defined totem area that further identify the totem. In an alternative embodiment, unique totem touch locations may be resolved on an individual basis to determine a totem, such as a prearranged pattern of touch points (parallel lines, circle-shaped, or star-shaped touch points). Once the host operating system resolves the touch points as a totem position, the totem position is provided to totem analyzer 52 so that totem analyzer can associate the detected spectral analysis signature with the totem identification provided from the host operating system. In another alternative embodiment, initial identification of a totem is provided by touch controller detection of totem touch regions and then tracking of the totem position is performed with the spectral signature associated with the totem identification reported by the host operating system.

Figure 15:
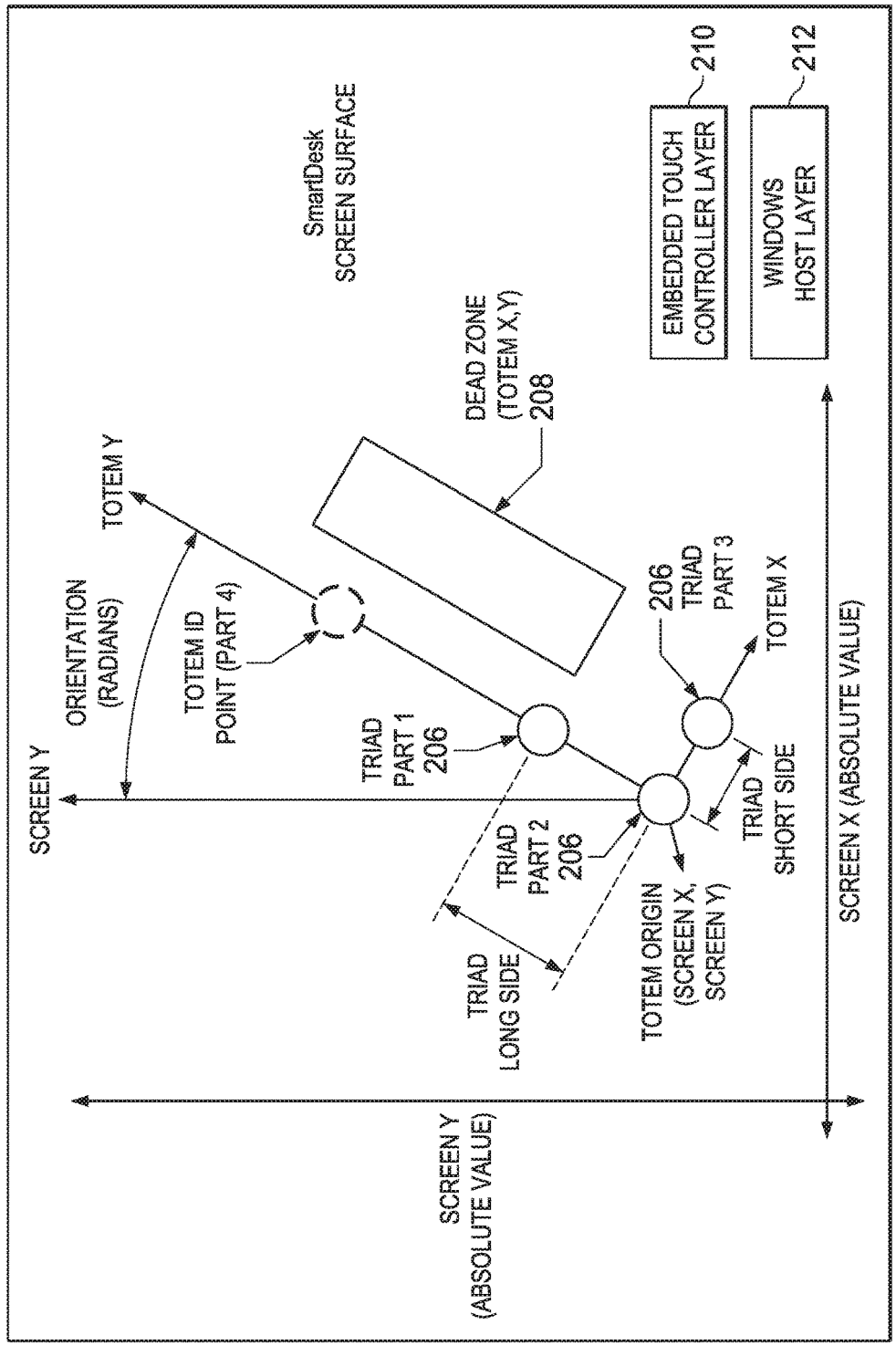
FIG. 15 depicts an example embodiment of a totem position resolved from spectral analysis of multiple totem touch regions.

Referring now to FIG. 15, an example embodiment depicts a totem position resolved from spectral analysis of multiple totem touch regions 206. In the example embodiment, three totem contact regions 206 provide sufficient spectral signature to track totem position and estimate a fourth totem touch region lifted from the touch screen. For example, totem analyzer 52 may include spectral signatures for incomplete totem touch regions to support spectral signature totem tracking where a totem is not completely placed on the touch surface. Once a totem identification is resolved based upon the spectral signature, a dead zone 208 is defined for the projected totem footprint to allow the host operating system to reduce its workload by ignoring touches in the touchscreen region associated with the totem.

Figure 16:
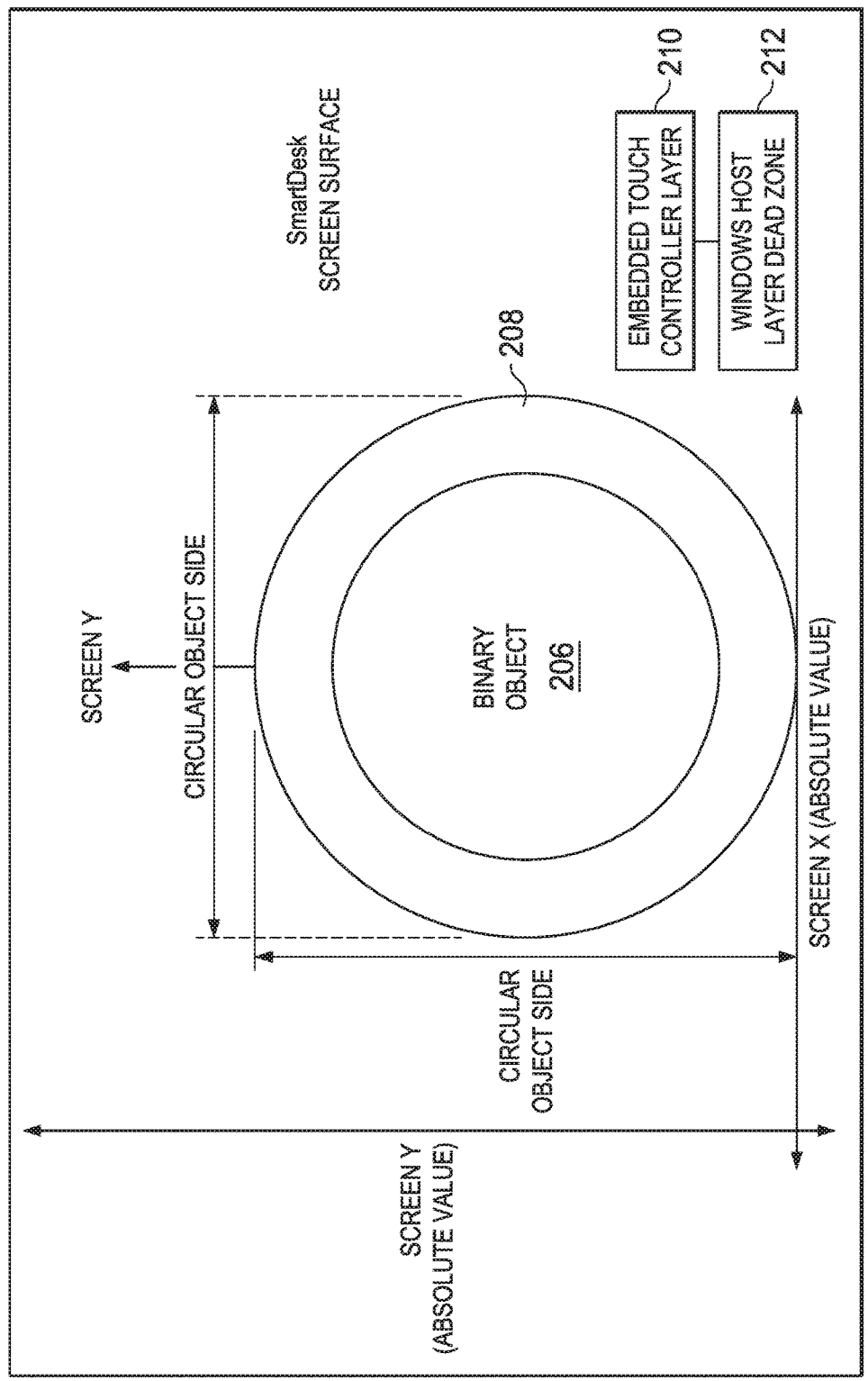
FIG. 16 depicts an example embodiment of a totem position solved from spectral analysis of a circular totem touch region.

Referring now to FIG. 16, an example embodiment depicts a totem position resolved from spectral analysis of a circular totem touch region. As set forth above, the totem identification may be performed by comparison of the frequency domain signal from the touchscreen or by comparison of detected touch areas with known totem footprints. Once the totem identification is resolved, position and rotational orientation are tracked by changes detected in the spectral signature. A dead zone 208 defined relative to the predicted totem position removes workload from the host operating system for tracking inputs at the touchscreen.

Although the present invention has been described in detail, it should be understood that various changes, substitutions and alterations can be made hereto without departing from the spirit and scope of the invention as defined by the appended claims.

What is claimed is:

1. An information handling system comprising:
a processor executing instructions to process information;
a memory interfaced with the processor, the memory storing the information;
a display interfaced with the processor and memory, the display presenting the information as visual images, the display having touchscreen operable to detect touch inputs made at the display;
a totem resting on the touchscreen, the totem having a body with a bottom surface and on or more contact surfaces extending from the bottom surface, one or more of the contact surfaces having a conductive interface to the body, the conductive interface biased to a non-conductive state and moveable to a conductive state by a force pressing on the totem body towards the display; and
a touch controller interfaced with the touchscreen and the processor, the touch controller analyzing touches detected at the touchscreen and differentiating inputs based at least in part upon whether one or more of the contact surfaces have a conductive state or non-conductive state.

2. The information handling system of claim 1 wherein the touch controller comprises a digital signal processor having a spectral analysis engine tuned to differentiate the conductive state and non-conductive state.

3. The information handling system of claim 1 wherein the touch controller ignores inputs associated with the totem unless predetermined of the contact surfaces have the conductive state.

4. The information handling system of claim 1 wherein the one or more contact surfaces comprise plural feet and wherein the touch controller enforces an ignore zone extending from an outer periphery of the totem for a predetermined distance if plural of the predetermined feet have the conductive state.

5. The information handling system of claim 4 wherein the predetermined feet comprise plural feet distributed at the periphery of the totem, the conductive state indicating a user hand placed on the totem.

6. The information handling system of claim 4 wherein the conductive interface to the body comprises a spring disposed between each of the plural feet and the body, each spring biasing an associated of the plural feet to a non-conductive state.

7. The information handling system of claim 6 further comprising a battery disposed in the totem and providing a charge to each of the plural feet when in a conductive state.

8. The information handling system of claim 4 wherein the touch controller applies a first hysteresis if the plural feet have a first conductive state and a second hysteresis if the plural feet have a second conductive state.

9. A method for interfacing an information handling system with a totem device, the method comprising:
detecting a foot contact surface of the totem on a touchscreen display surface;
determining the totem in a conductive state if the contact surface has a first capacitance;
determining the totem in a non-conductive state if the contact surface foot has a second capacitance; and
responding to totem inputs in a first manner if a conductive state is determined and a second manner if a non-conductive state is determined.

10. The method of claim 9 further comprising:
biasing the contact surface foot away from a totem body; and
pressing the contact surface foot towards the totem body to create the conductive state, the contact surface foot having an increased capacitance when in proximity to the totem body.

11. The method of claim 10 wherein the pressing the contact surface foot towards the totem body to create the conductive state further comprises creating the conductive state by interfacing a charge from the totem body with the contact surface foot.

12. The method of claim 10 wherein the biasing the contact surface foot away from the totem body further comprises disposing a spring between the contact surface foot and the totem body.

13. The method of claim 9 wherein the responding to totem inputs further comprises ignoring totem inputs in the non-conductive state.

14. The method of claim 9 further comprising:
   forwarding totem inputs to an operating system in the conductive state, the totem inputs forwarded as length, width and rotational orientation; and
   ignoring touch inputs at the touchscreen display in the conductive state within a predetermined distance to a periphery of the totem.

15. An information handling system totem input device comprising:
   a main body sized to accept inputs from an end user hand;
   plural feet extending from the main body bottom surface;
   plural biasing devices, each biasing device disposed between one of the plural feet and the main body and acting to separate the associated one of the plural feet from the main body; and
   a touch controller interfaced with a capacitive touch sensor and detecting first and second conductive states associated with the plural feet based at least in part upon the distance between the plural feet and the main body.

16. The information handling system totem input device of claim 15 further comprising a charge stored in the main body, the charge communicated to the plural feet at a predetermined distance between the main body and the plural feet.

17. The information handling system totem input device of claim 16 wherein the predetermined distance is triggered by a predetermined weight resting on the main body.

18. The information handling system totem input device of claim 16 wherein the charge comprises a battery disposed in the main body.

19. The information handling system totem input device of claim 16 wherein the predetermined distance depends at least in part upon the availability of camera images captured of the totem.

20. The information handling system totem input device of claim 15 wherein the touch controller is further operable to enforce ignore zones at the capacitive touch sensor based at least in part upon whether the first or second conductive state exists.

* * * * *